(12) United States Patent
Sakhnini et al.

(10) Patent No.: US 12,425,990 B2
(45) Date of Patent: Sep. 23, 2025

(54) TIME GAPS IN SYNCHRONIZATION SIGNAL BLOCKS

(71) Applicant: QUALCOMM Incorporated, San Diego, CA (US)

(72) Inventors: Iyab Issam Sakhnini, San Diego, CA (US); Tao Luo, San Diego, CA (US)

( * ) Notice: Subject to any disclaimer, the term of this patent is extended or adjusted under 35 U.S.C. 154(b) by 0 days.

(21) Appl. No.: 17/161,120

(22) Filed: Jan. 28, 2021

(65) Prior Publication Data

US 2022/0240201 A1    Jul. 28, 2022

(51) Int. Cl.
*H04W 56/00* (2009.01)
*H04W 48/10* (2009.01)
*H04W 72/044* (2023.01)
*H04W 72/30* (2023.01)

(52) U.S. Cl.
CPC ......... *H04W 56/001* (2013.01); *H04W 48/10* (2013.01); *H04W 72/044* (2013.01); *H04W 72/30* (2023.01)

(58) Field of Classification Search
CPC ........... H04W 56/001; H04W 56/0015; H04W 48/10; H04W 72/048; H04W 72/005; H04W 72/044; H04W 74/006; H04W 72/0446; H04W 72/0493; H04W 74/002; H04W 52/0203; H04W 52/02; H04W 52/0206; H04W 52/0209; H04W 52/0212; H04W 52/0216; H04W 36/24; H04W 24/10; H04W 24/08; H04W 4/021; H04W 8/24; H04W 76/27; H04L 5/0048; H04L 27/26025; H04L 27/2613; H04J 11/0073; H04J 11/0076
See application file for complete search history.

(56) References Cited

U.S. PATENT DOCUMENTS

| | | | |
|---|---|---|---|
| 10,153,831 B1* | 12/2018 | Gokhale | H04W 52/34 |
| 2010/0069028 A1* | 3/2010 | Choi | H04B 7/061 |
| | | | 455/136 |
| 2016/0183196 A1* | 6/2016 | Pitzely | H04W 52/08 |
| | | | 370/329 |
| 2016/0337998 A1* | 11/2016 | Kim | H04L 27/2628 |

(Continued)

FOREIGN PATENT DOCUMENTS

| | | | |
|---|---|---|---|
| DE | 102021109367 A1 | * | 10/2021 |
| JP | WO2021079529 | * | 4/2021 |
| TW | 202010338 | * | 3/2020 |

*Primary Examiner* — Sudesh M Patidar

(57) ABSTRACT

Various aspects of the present disclosure generally relate to wireless communication. In some aspects, a user equipment (UE) may receive, using a first bandwidth, at least one synchronization signal associated with a synchronization signal block (SSB). The UE may receive, using a second bandwidth, at least one signal associated with a broadcast channel and associated with the SSB. The at least one synchronization signal and the at least one signal associated with the broadcast channel are separated by a time gap. In some aspects, the at least one synchronization signal and the at least one signal associated with the broadcast channel are received using a second beam. Accordingly, the UE may additionally receive, using a first beam, at least one additional synchronization signal associated with an additional SSB. The SSB and the additional SSB are separated by a beam switching gap. Numerous other aspects are described.

30 Claims, 12 Drawing Sheets

(56) References Cited

U.S. PATENT DOCUMENTS

| | | | |
|---|---|---|---|
| 2016/0359579 A1* | 12/2016 | Murrin | H04L 27/2678 |
| 2017/0332416 A1 | 11/2017 | Kiss et al. | |
| 2018/0206237 A1* | 7/2018 | Koorapaty | H04L 5/001 |
| 2018/0288757 A1* | 10/2018 | Sun | H04B 7/088 |
| 2019/0028244 A1* | 1/2019 | Si | H04W 56/00 |
| 2019/0166612 A1* | 5/2019 | Yokomakura | H04W 72/1273 |
| 2019/0220071 A1 | 7/2019 | Stefankiewicz et al. | |
| 2019/0364556 A1* | 11/2019 | Davydov | H04B 7/088 |
| 2020/0120624 A1* | 4/2020 | Lin | H04W 72/042 |
| 2020/0136738 A1* | 4/2020 | Zhang | H04J 11/0073 |
| 2020/0137596 A1* | 4/2020 | Oh | H04W 56/0005 |
| 2020/0178190 A1* | 6/2020 | Chen | H04W 48/10 |
| 2020/0313835 A1* | 10/2020 | Ji | H04L 5/023 |
| 2021/0083748 A1* | 3/2021 | Guan | H04B 7/0404 |
| 2021/0091879 A1* | 3/2021 | Xing | H04L 5/0064 |
| 2021/0105165 A1* | 4/2021 | Ko | H04L 5/0048 |
| 2021/0105722 A1* | 4/2021 | Tsai | H04W 52/0219 |
| 2021/0120581 A1* | 4/2021 | Kim | H04L 1/0003 |
| 2021/0195589 A1* | 6/2021 | Immonen | H04W 76/15 |
| 2021/0337494 A1* | 10/2021 | Ye | H04B 7/0639 |
| 2021/0360558 A1* | 11/2021 | Zheng | H04W 72/0446 |
| 2021/0385831 A1* | 12/2021 | Nogami | H04W 72/042 |
| 2022/0053546 A1* | 2/2022 | Shi | H04W 72/1273 |
| 2022/0131731 A1* | 4/2022 | Yang | H04L 5/0051 |
| 2023/0261838 A1* | 8/2023 | Dai | H04W 56/0015 |
| 2023/0319816 A1* | 10/2023 | Ali | H04L 27/26025 370/329 |

\* cited by examiner

TIME GAPS IN SYNCHRONIZATION SIGNAL BLOCKS

FIELD OF THE DISCLOSURE

Aspects of the present disclosure generally relate to wireless communication and to techniques and apparatuses for configuring time gaps in synchronization signal blocks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to receive, from a base station and using a first bandwidth, at least one synchronization signal associated with a synchronization signal block (SSB); and receive, from the base station, using a second bandwidth, at least one signal associated with a broadcast channel and associated with the SSB, wherein the at least one synchronization signal and the at least one signal associated with the broadcast channel are separated by a time gap.

In some aspects, a base station for wireless communication includes a memory and one or more processors operatively coupled to the memory, the memory and the one or more processors configured to transmit, using a first bandwidth, at least one synchronization signal associated with an SSB; and transmit, using a second bandwidth, at least one signal associated with a broadcast channel and associated with the SSB, wherein the at least one synchronization signal and the at least one signal associated with the broadcast channel are separated by a time gap.

In some aspects, a method of wireless communication performed by a UE includes receiving, from a base station and using a first bandwidth, at least one synchronization signal associated with an SSB; and receiving, from the base station, using a second bandwidth, at least one signal associated with a broadcast channel and associated with the SSB, wherein the at least one synchronization signal and the at least one signal associated with the broadcast channel are separated by a time gap.

In some aspects, a method of wireless communication performed by a base station includes transmitting, using a first bandwidth, at least one synchronization signal associated with an SSB; and transmitting, using a second bandwidth, at least one signal associated with a broadcast channel and associated with the SSB, wherein the at least one synchronization signal and the at least one signal associated with the broadcast channel are separated by a time gap.

In some aspects, a non-transitory computer-readable medium storing a set of instructions for wireless communication includes one or more instructions that, when executed by one or more processors of a UE, cause the UE to receive, from a base station and using a first bandwidth, at least one synchronization signal associated with an SSB; and receive, from the base station, using a second bandwidth, at least one signal associated with a broadcast channel and associated with the SSB, wherein the at least one synchronization signal and the at least one signal associated with the broadcast channel are separated by a time gap.

In some aspects, a non-transitory computer-readable medium storing a set of instructions for wireless communication includes one or more instructions that, when executed by one or more processors of a base station, cause the base station to transmit, using a first bandwidth, at least one synchronization signal associated with an SSB; and transmit, using a second bandwidth, at least one signal associated with a broadcast channel and associated with the SSB, wherein the at least one synchronization signal and the at least one signal associated with the broadcast channel are separated by a time gap.

In some aspects, an apparatus for wireless communication includes means for receiving, from a base station and using a first bandwidth, at least one synchronization signal associated with an SSB; and means for receiving, from the base station, using a second bandwidth, at least one signal associated with a broadcast channel and associated with the SSB, wherein the at least one synchronization signal and the at least one signal associated with the broadcast channel are separated by a time gap.

In some aspects, an apparatus for wireless communication includes means for transmitting, using a first bandwidth, at least one synchronization signal associated with an SSB; and means for transmitting, using a second bandwidth and after a time gap following transmission of the at least one synchronization signal, at least one signal associated with a broadcast channel and associated with the SSB, wherein the at least one synchronization signal and the at least one signal associated with the broadcast channel are separated by a time gap.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
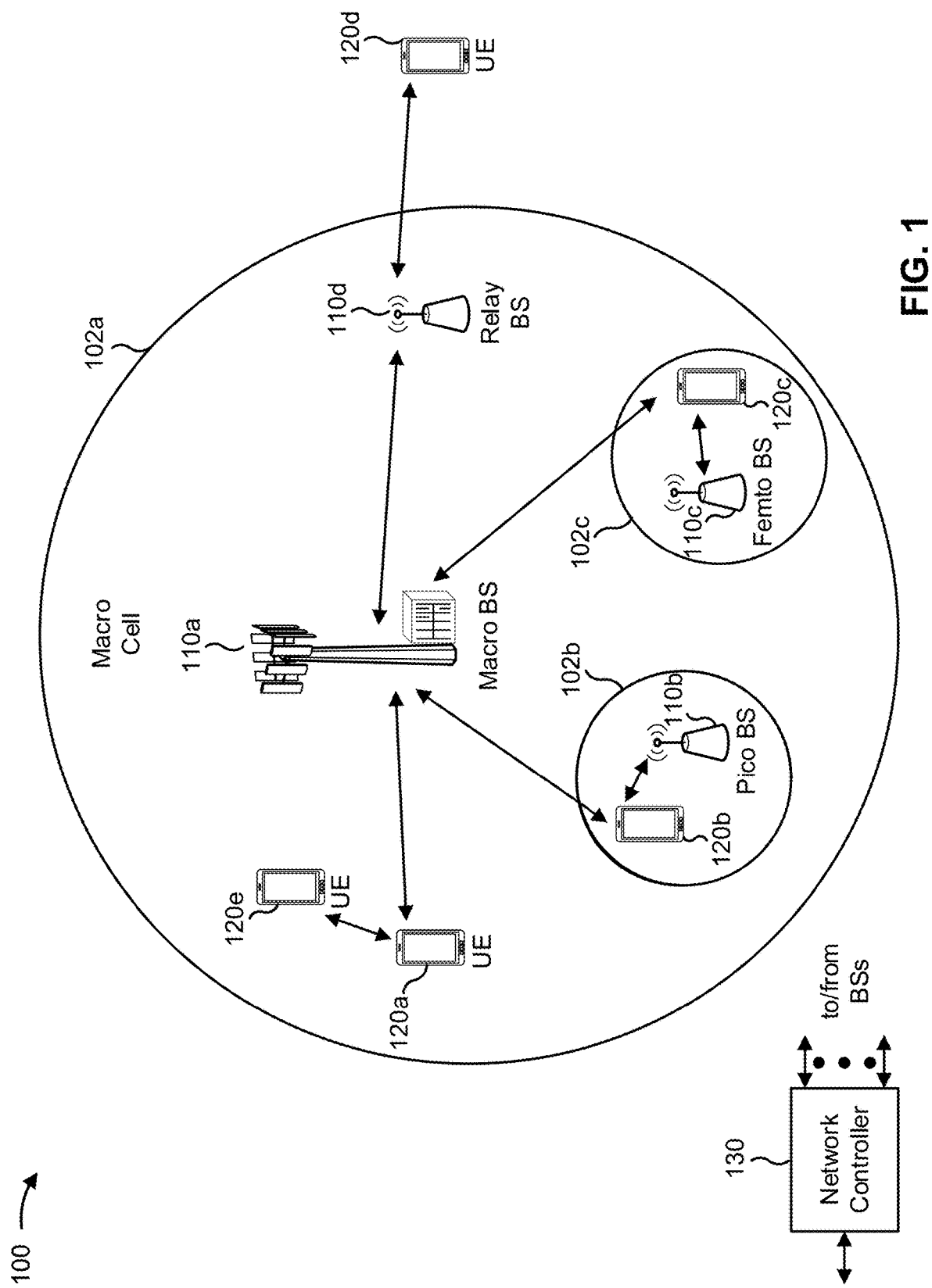
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
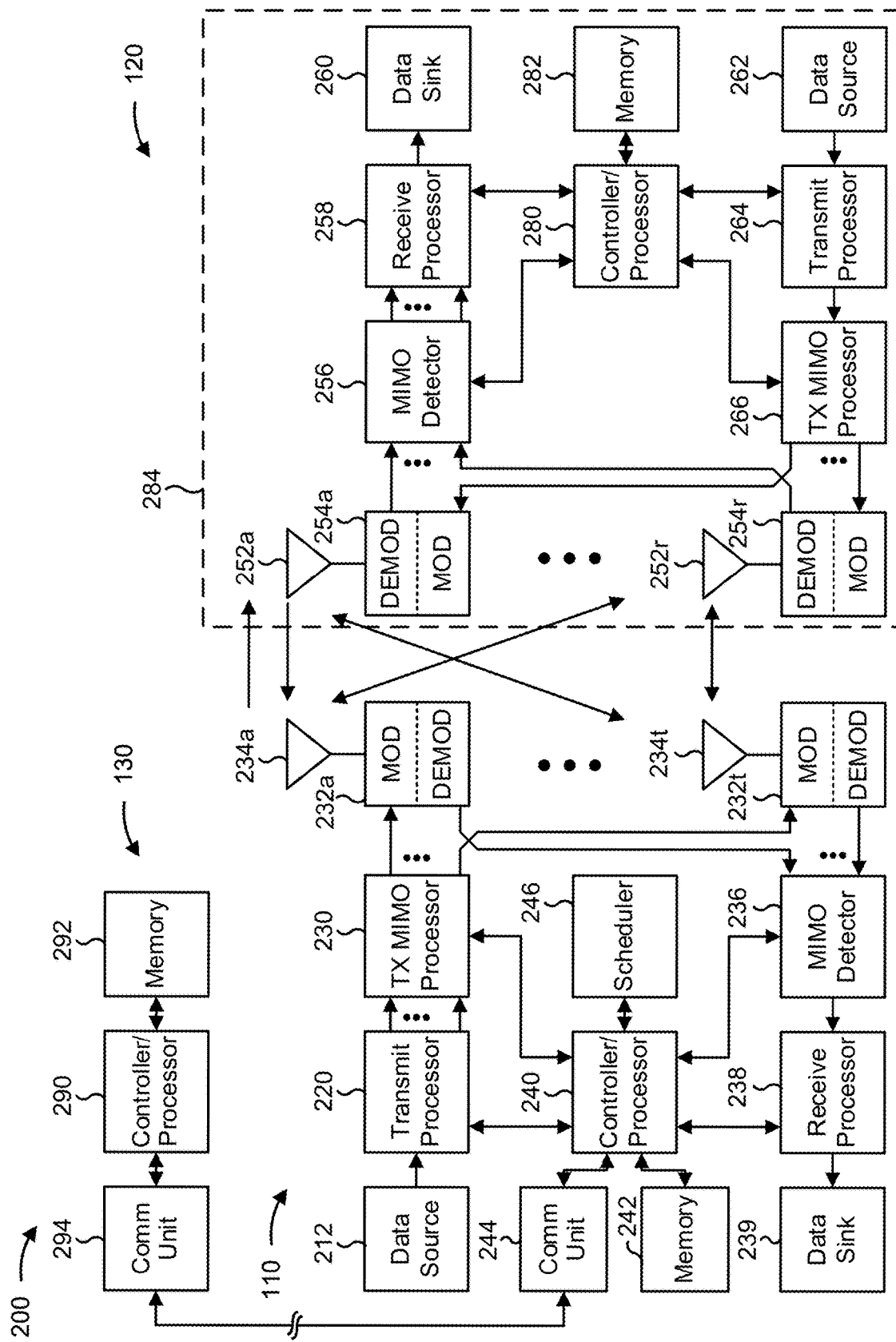
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6A-6C.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6A-6C.

Controller/processor 240 of base station 110, controller/processor 280 of UE 120, and/or any other component(s) of FIG. 2 may perform one or more techniques associated with configuring time gaps in SSBs, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a UE (e.g., the UE 120 and/or apparatus 900 of FIG. 9) may include means for receiving, from a base station (e.g., the base station 110 and/or apparatus 1000 of FIG. 10) and using a first bandwidth, at least one synchronization signal associated with an SSB; and/or means for receiving, from the base station, using a second bandwidth, at least one signal associated with a broadcast channel and associated with the SSB. The at least one synchronization signal and the at least one signal associated with the broadcast channel may be separated by a time gap. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE may further include means for receiving, from the base station, at least one of a CORESET or a SIB message. Additionally, or alternatively, the UE may include means for receiving, from the base station, using a first beam, at least one additional synchronization signal associated with an additional SSB; and/or means for receiving, from the base station, using the first beam, at least one additional signal associated with the broadcast channel and associated with the additional SSB. The at least one additional synchronization signal and the at least one additional signal associated with the broadcast channel may be separated by the time gap. Additionally, the SSB and the additional SSB may be separated by at least a beam switching gap, and the at least one synchronization signal and the at least one signal associated with the broadcast channel may be received using a second beam.

In some aspects, the UE may include means for configuring at least one antenna of the UE to receive the second bandwidth during the time gap. Additionally, or alternatively, the UE may include means for receiving, from the base station, using the second bandwidth and during the time gap, a retransmission of the at least one signal associated with the broadcast channel. In some aspects, the UE may include means for receiving, from the base station, a message indicating a length of the time gap.

In some aspects, a base station (e.g., the base station 110 and/or apparatus 1000 of FIG. 10) may include means for transmitting, using a first bandwidth, at least one synchronization signal associated with an SSB; and/or means for transmitting, using a second bandwidth, at least one signal associated with a broadcast channel and associated with the SSB. The at least one synchronization signal and the at least one signal associated with the broadcast channel may be separated by a time gap. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station may further include means for transmitting at least one of a CORESET or an SIB message. Additionally, or alternatively, the base station may include means for transmitting, using a first beam, at least one additional synchronization signal associated with an additional SSB; and/or means for transmitting, using the first beam, at least one additional signal associated with the broadcast channel and associated with the additional SSB. The at least one additional synchronization signal and the at least one additional signal associated with the broadcast channel may be separated by the time gap. Additionally, the SSB and the additional SSB may be separated by at least a beam switching gap, and the at least one synchronization signal and the at least one signal associated with the broadcast channel may be transmitted using a second beam.

In some aspects, the base station may include means for transmitting at least one of cyclic prefix signals or guard interval signals during the time gap; means for transmitting, during the time gap, one or more tail symbols encoded using a Fourier transform procedure; and/or means for transmitting, using the second bandwidth and during the time gap, a retransmission of the at least one signal associated with the broadcast channel. In some aspects, the base station may include means for transmitting a message indicating a length of the time gap.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
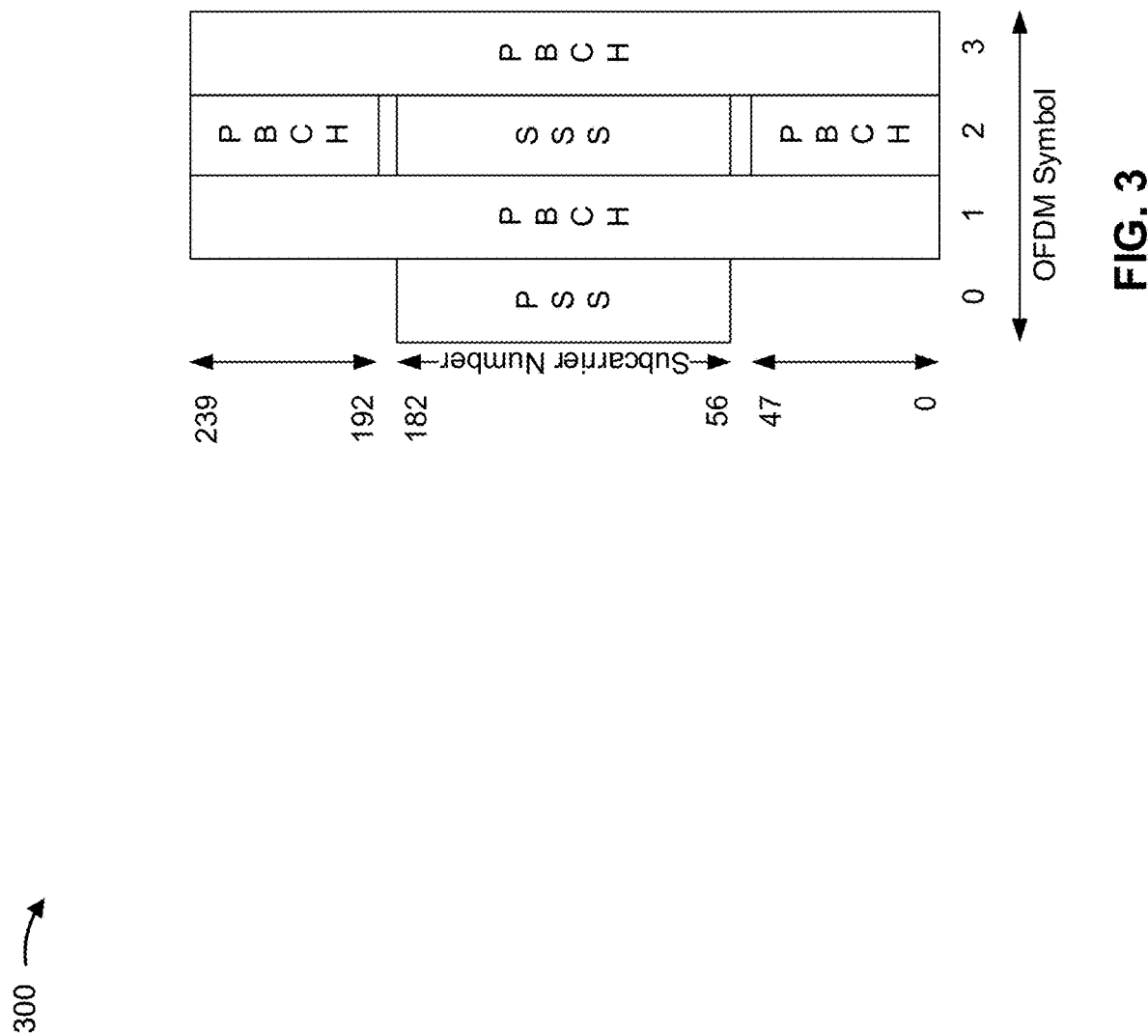
FIG. 3 is a diagram illustrating an example of a synchronization signal block (SSB), in accordance with the present disclosure.

FIG. 3 is a diagram illustrating an example 300 of a synchronization signal block (SSB), in accordance with the present disclosure. Example 300 shows an SSB that may be transmitted by a base station (e.g., base station 110) and received by a UE (e.g., UE 120).

In example 300, the SSB includes 4 symbols (e.g., OFDM symbols). As shown in FIG. 3, one symbol may include a primary synchronization signal (PSS). The PSS may include a frequency domain-based sequence (e.g., an M-sequency) of length 127, which may be mapped to 127 subcarriers, as shown in FIG. 3. Another symbol may include a secondary synchronization signal (SSS). The SSS may include a frequency domain-based sequence (e.g., a Gold code sequency) of length 127, which may be mapped to 127 subcarriers, as shown in FIG. 3. The remaining two symbols may include signals encoding content for a broadcast channel (e.g., a physical broadcast channel (PBCH) in example 300). For example, the broadcast channel may carry a master information block (MIB) message (e.g., an MIB message as defined in 3GPP specifications and/or another standard). The broadcast channel may be modulated using quadrature phase shift keying (QPSK) and multiplexed with an associated DMRS. Additionally, the signals encoding content for the broadcast channel may also be multiplexed (e.g., in frequency as shown in FIG. 3) with the SSS.

The UE 120 may use the SSB for initialization a connection with the base station 110. For example, the UE 120 may apply a sliding window and attempt all possible sequences for the PSS in order to obtain timing information associated with the base station 110. Accordingly, the UE 120 may proceed with decoding a system information block (SIB) message (e.g., an SIB1 message as defined in 3GPP specifications and/or another standard) from the base station 110 and use the information included in the SIB message to establish a radio resource control (RRC) connection with the base station 110.

Additionally, or alternatively, the UE 120 may measure the SSB in order to update timing information associated with the base station 110 (e.g., such that the UE 120 can be paged by the base station 110 while in an idle mode or an inactive state) and/or to select one or more beams to use when communicating with the base station 110. For example, the UE 120 may generate channel state information (CSI) reports for different beams associated with different SSBs based at least in part on measurements of those SSBs. Accordingly, the UE 120 and/or the base station 110 may select one or more beams based at least in part on the CSI reports.

As indicated above, FIG. 3 is provided as an example. Other examples may differ from what is described with respect to FIG. 3.

Figure 4A:
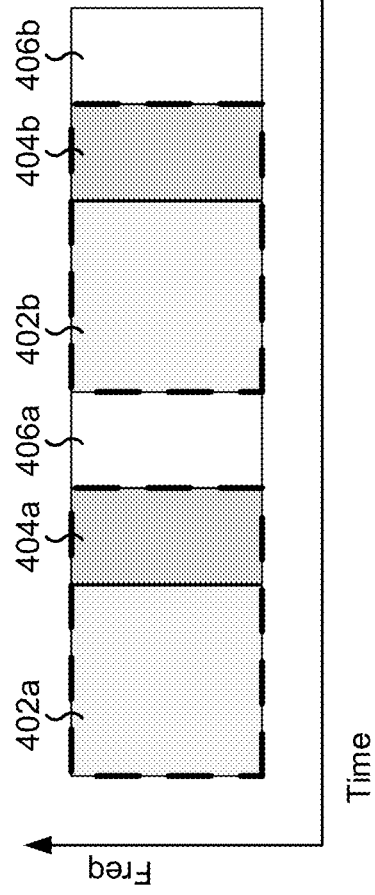
FIGS. 4A and 4B are diagrams illustrating examples of a control resource set (CORESET) and/or a system information block (SIB) message time division multiplexed (TDM'd) with an SSB, in accordance with the present disclosure.

FIG. 4A is a diagram illustrating an example 400 of a control resource set (CORESET) that is time division multiplexed (TDM'd) with an SSB, in accordance with various aspects of the present disclosure. Example 400 shows an SSB 402a and a CORESET 404a that may be transmitted by a base station (e.g., base station 110) and received by a UE (e.g., UE 120). The CORESET 404a may include a CORESET0 as defined in 3GPP specifications and/or another standard. Accordingly, the CORESET 404a may include resources for a physical downlink control channel (PDCCH) that carries downlink control information (DCI) for scheduling transmission of an SIB message (e.g., an SIB1 message as defined in 3GPP specifications and/or another standard). As shown in FIG. 4A, the SSB 402a and the CORESET 404a may be transmitted as a single block in the time domain.

As further shown in FIG. 4A, the base station 110 may provide a beam switching gap 406a between the CORESET 404a and a different SSB 402b, which may similarly be transmitted as a block with an associated CORESET 404b. For example, the UE 120 may receive the SSB 402a and the CORESET 404a using one spatial filter, associated with a first beam, and then apply a different spatial filter, associated with a second beam, to one or more antennas of the UE 120 during the beam switching gap 406a. Accordingly, the base station 110 transmits the SSB 402a and the CORESET 404a using the first beam and transmits the SSB 402b and the CORESET 404b using the second beam. Although described above using two beams, the description similarly applies to using more than two beams (e.g., three beams, four beams, and so on). For example, the beam switching gap 406b may precede yet another SSB, which may be associated with a third beam and transmitted as a block with an associated CORESET.

Figure 4B:
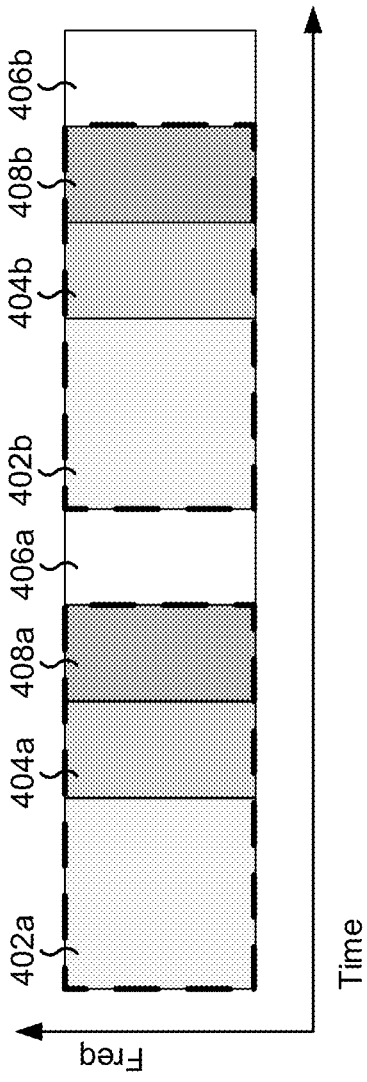

FIG. 4B is a diagram illustrating an example 450 of a CORESET and an SIB message that is TDM'd with an SSB, in accordance with various aspects of the present disclosure. Example 450 shows an SSB 402a, a CORESET 404a, and an SIB message 408a that may be transmitted by a base station (e.g., base station 110) and received by a UE (e.g., UE 120). The CORESET 404a may include a CORESET0 as defined in 3GPP specifications and/or another standard, and the SIB message 408a may include an SIB1 message as defined in 3GPP specifications and/or another standard. As shown in FIG. 4B, the SSB 402a, the CORESET 404a, and the SIB message 408a may be transmitted as a single block in the time domain.

As further shown in FIG. 4B, the base station 110 may provide a beam switching gap 406a between the SIB message 408a and a different SSB 402b, which may similarly be transmitted as a block with an associated CORESET 404b and an associated SIB message 408b. For example, the UE 120 may receive the SSB 402a, the CORESET 404a, and the SIB message 408a using one spatial filter, associated with a first beam, and then apply a different spatial filter, associated with a second beam, to one or more antennas of the UE 120 during the beam switching gap 406a. Accordingly, the base station 110 transmits the SSB 402a, the CORESET 404a, and the SIB message 408a using the first beam and transmits the SSB 402b, the CORESET 404b, and the SIB message 408b using the second beam. Although described above using two beams, the description similarly applies to using more than two beams (e.g., three beams, four beams, and so on). For example, the beam switching gap 406b may precede yet another SSB, which may be associated with a third beam and transmitted as a block with an associated CORESET and an associated SIB message.

As indicated above, FIGS. 4A and 4B are provided as examples. Other examples may differ from what is described with respect to FIGS. 4A and 4B.

Figure 5B:
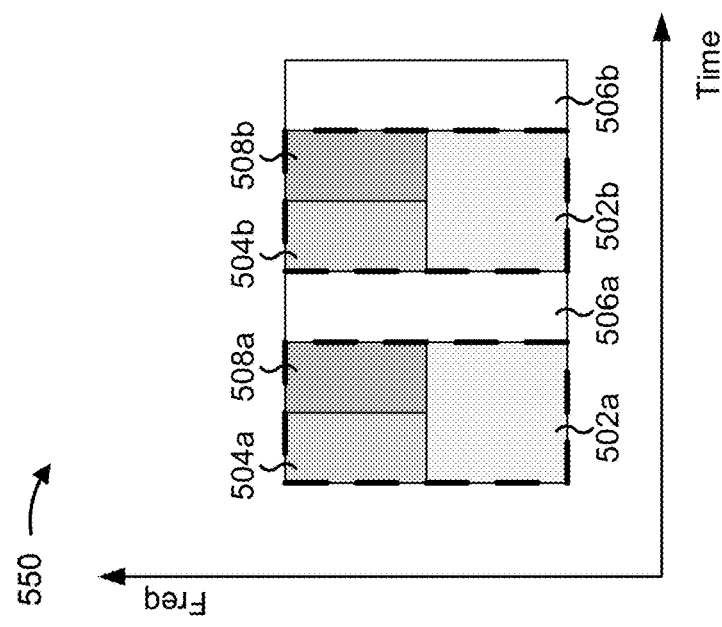
FIGS. 5A and 5B are diagrams illustrating examples of a CORESET and/or an SIB message frequency division multiplexed (FDM'd) with an SSB, in accordance with the present disclosure.
Figure 5A:
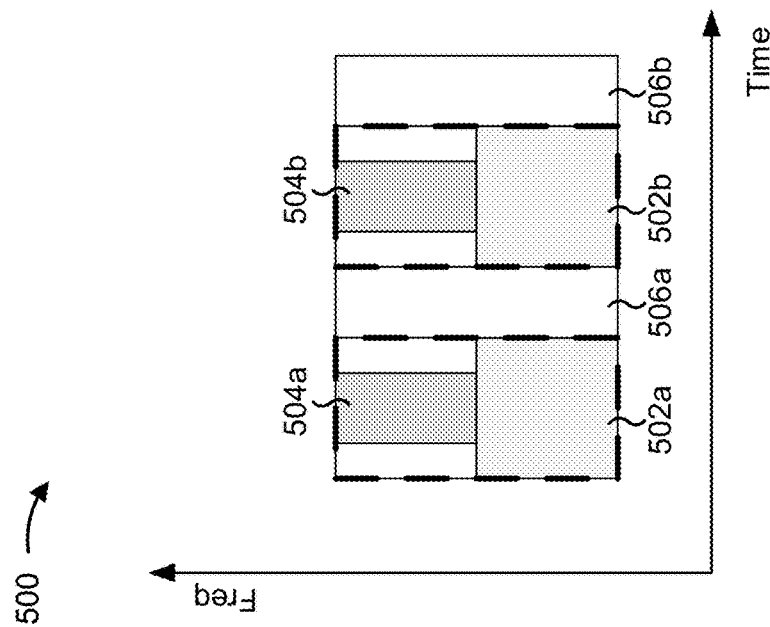

FIG. 5A is a diagram illustrating an example 500 of a CORESET that is frequency division multiplexed (FDM'd) with an SSB, in accordance with the present disclosure. Example 500 shows an SSB 502a and a CORESET 504a that may be transmitted by a base station (e.g., base station 110) and received by a UE (e.g., UE 120). The CORESET 504a may include a CORESET0 as defined in 3GPP specifications and/or another standard. Accordingly, the CORESET 504a may include resources for a PDCCH that carries DCI for scheduling transmission of an SIB message (e.g., an SIB1 message as defined in 3GPP specifications and/or another standard). As shown in FIG. 5A, the SSB 502a and the CORESET 504a may be multiplexed in the frequency domain (e.g., mapped to different subcarriers and transmitted overlapping in time by the base station 110).

As further shown in FIG. 5A, the base station 110 may provide a beam switching gap 506a between the SSB 502a and a different SSB 502b, which may similarly be multiplexed in the frequency domain with an associated CORESET 504b. For example, the UE 120 may receive the SSB 502a and the CORESET 504a using one spatial filter, associated with a first beam, and then apply a different spatial filter, associated with a second beam, to one or more antennas of the UE 120 during the beam switching gap 506a. Accordingly, the base station 110 transmits the SSB 502a and the CORESET 504a using the first beam and transmits the SSB 502b and the CORESET 504b using the second beam. Although described above using two beams, the description similarly applies to using more than two beams (e.g., three beams, four beams, and so on). For example, the beam switching gap 506b may precede yet another SSB, which may be associated with a third beam and transmitted as a block with an associated CORESET.

FIG. 5B is a diagram illustrating an example 550 of a CORESET and an SIB message that is FDM'd with an SSB, in accordance with the present disclosure. Example 550 shows an SSB 502a, a CORESET 504a, and an SIB message 508a that may be transmitted by a base station (e.g., base station 110) and received by a UE (e.g., UE 120). The CORESET 504a may include a CORESET0 as defined in 3GPP specifications and/or another standard, and the SIB message 508a may include an SIB1 message as defined in 3GPP specifications and/or another standard. As shown in FIG. 5B, the SSB 502a, the CORESET 504a, and the SIB message 508a may be multiplexed in the frequency domain (e.g., mapped to different subcarriers and transmitted overlapping in time by the base station 110).

As further shown in FIG. 5B, the base station 110 may provide a beam switching gap 506a between the SSB 502a and a different SSB 402b, which may similarly be multiplexed in the frequency domain with an associated CORESET 504b and an associated SIB message 508b. For example, the UE 120 may receive the SSB 502a, the CORESET 504a, and the SIB message 508a using one spatial filter, associated with a first beam, and then apply a different spatial filter, associated with a second beam, to one or more antennas of the UE 120 during the beam switching gap 506a. Accordingly, the base station 110 transmits the SSB 502a, the CORESET 504a, and the SIB message 508a using the first beam and transmits the SSB 502b, the CORESET 504b, and the SIB message 508b using the second beam. Although described above using two beams, the description similarly applies to using more than two beams (e.g., three beams, four beams, and so on). For example, the beam switching gap 506b may precede yet another SSB, which may be associated with a third beam and transmitted as a block with an associated CORESET and an associated SIB message.

As indicated above, FIGS. 5A and 5B are provided as examples. Other examples may differ from what is described with respect to FIGS. 5A and 5B.

In some situations, a base station may use single-carrier waveforms (e.g., DFT-s-OFDM, single-carrier quadrature amplitude modulation (SC-QAM), and/or another single-carrier technology) to transmit (e.g., to one or more UEs). For example, the base station may use single-carrier waveforms in order to reduce peak-to-average power ratio (PARP) in higher operating bands (e.g., FR2 or higher bandwidths). Generally, single-carrier waveforms can be used to transmit more information in a period of time as compared with carrier aggregation techniques. However, the single-carrier waveforms usually allow for less multiplexing in the frequency domain. Accordingly, when transmitting an SSB, the base station may separate, in the time domain, signals encoding content for a broadcast channel (e.g., a PBCH) from associated DMRSs. Additionally, or alternatively, the base station may separate an SSS, in the time domain, from signals encoding content for the broadcast channel.

Some techniques and apparatuses described herein enable a base station (e.g., base station 110) to include a time gap between synchronization signals (e.g., a PSS and/or an SSS) of an SSB and signals associated with a broadcast channel (e.g., signals encoding content for a PBCH and/or associated DMRSs) of that SSB. As a result, the base station 110 may transmit the synchronization signals using a different bandwidth than a bandwidth used to transmit the signals associated with the broadcast channel. For example, the base station 110 may use a smaller bandwidth for the synchronization signals in order to conserve power and network overhead but may use a larger bandwidth for the signals associated with the broadcast channel in order to improve reliability and/or quality of those signals. Additionally, a UE (e.g., UE 120) receiving the SSB may switch bandwidths during the time gap provided by the base station 110. Accordingly, the UE 120 may conserve power while receiving the synchronization signals but improve reliability and/or quality when receiving the signals associated with the broadcast channel.

Figure 6A:
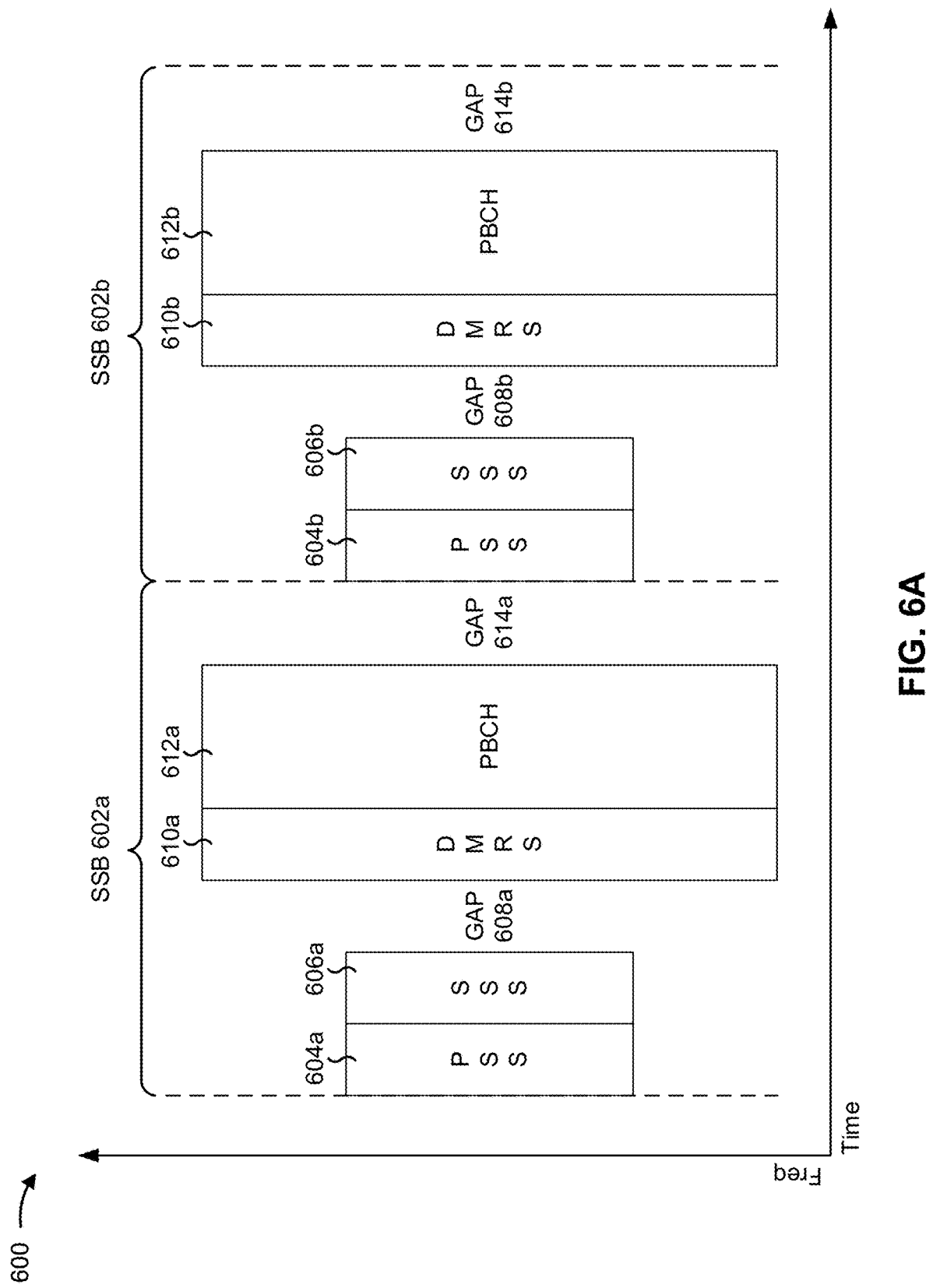
FIGS. 6A, 6B, and 6C are diagrams illustrating examples associated with configuring time gaps in SSBs, in accordance with the present disclosure.

FIG. 6A is a diagram illustrating an example 600 associated with configuring time gaps in SSBs, in accordance with the present disclosure. Example 600 shows an SSB 602a that may be transmitted by a base station (e.g., base station 110) and received by a UE (e.g., UE 120). In some aspects, the base station 110 may transmit, and the UE 120 may receive, at least one synchronization signal using a first bandwidth. For example, the at least one synchronization signal may include a PSS (e.g., PSS 604a), an SSS (e.g., SSS 606a), or a combination thereof (e.g., as shown in example 600).

Additionally, the base station 110 may transmit, and the UE 120 may receive, at least one signal associated with a broadcast channel using a second bandwidth. The base station 110 may transmit, and the UE 120 may receive, the at least one signal associated with the broadcast channel, after a time gap 608a following the at least one synchronization signal. In some aspects, the broadcast channel may include a PBCH. Accordingly, the at least one signal may include a DMRS (e.g., DMRS 610a), a signal encoding content for the PBCH (e.g., signal 612a), or a combination thereof (e.g., as shown in example 600).

The time gap 608a may include one or more symbols (e.g., one or more DFT-s-OFDM symbols, one or more SC-QAM symbols) during which the base station 110 does not transmit signals associated with the SSB 602a. Accordingly, the UE 120 may configure at least one antenna of the UE 120 to receive the second bandwidth during the time gap 608a. For example, the UE 120 may adjust a gain, a receive power, a demodulation setting, and/or another physical property and/or software setting associated with the at least one antenna in order to receive using the second bandwidth. In some aspects, as shown in FIG. 6A, the first bandwidth may be smaller than the second bandwidth such that the UE 120 conserves power when receiving the at least one synchronization signal. Additionally, the UE 120 may adjust the at least one antenna before receiving the at least one synchronization signal in order to better filter noise and improve reliability and/or quality. Accordingly, the UE 120 may use the time gap 608a in order to re-adjust the at least one antenna for receiving the second, larger bandwidth.

In some aspects, a length of the time gap 608a may be based at least in part on a setting stored in a memory of the UE 120 and/or a memory of the base station 110. For example, the UE 120 and/or the base station 110 may be programmed (and/or otherwise preconfigured) with the length according to 3GPP specifications and/or another standard. As an alternative, a length of the time gap 608a may be determined based at least in part on the at least one synchronization signal. For example, the base station 110 may select a sequence for the PSS 604a and/or a sequence for the SSS 606a such that the UE 120 may determine the length of the time gap 608a based at least in part on the sequence(s) selected. Accordingly, the UE 120 and/or the base station 110 may be programmed (and/or otherwise preconfigured) with a mapping of different sequences (or combinations of sequences) to different lengths (e.g., according to 3GPP specifications and/or another standard). As another alternative, the base station 110 may transmit, and the UE 120 may receive, a message indicating a length of the time gap 608a. For example, the base station 110 may transmit, and the UE 120 may receive, an RRC message, a medium access control (MAC) layer control element (MAC-CE), DCI, and/or another message that indicates the length. The base station 110 may transmit such a message when the UE 120 is using the SSB 602a for purposes other than initial connection with the base station 110 (e.g., as described above in connection with FIG. 3)

In some aspects, example 600 may be combined with example 400 or example 450. For example, the base station 110 may transmit, and the UE 120 may receive, at least one of a CORESET (e.g., a CORESET0 as defined in 3GPP specifications and/or another standard) or an SIB message (e.g., an SIB1 message as defined in 3GPP specifications and/or another standard) after receiving the at least one signal associated with the broadcast channel (e.g., DMRS 610a and/or signal 612a). As an alternative, example 600 may be combined with example 500 or example 550. For example, the base station 110 may transmit, and the UE 120 may receive, at least one of a co CORESET (e.g., a CORESET0 as defined in 3GPP specifications and/or another standard) or an SIB message (e.g., an SIB1 message as defined in 3GPP specifications and/or another standard) multiplexed with the at least one synchronization signal (e.g., PSS 604a and/or SSS 606a) and/or the at least one signal associated with the broadcast channel (e.g., DMRS 610a and/or signal 612a) in frequency. The base station 110 may perform such multiplexing when using DFT-s-OFDM technology and/or another single-carrier technology that permits frequency multiplexing.

Although described above with the at least one synchronization signal preceding the at least one signal associated with the broadcast channel, the SSB 602a may carry the at least one signal associated with the broadcast channel earlier in time than the at least one synchronization signal (e.g., as described below in connection with FIG. 6B).

Example 600 further shows another SSB 602b. For example, the SSB 602b may be associated with a first beam, and the SSB 602a may be associated with a second beam. Accordingly, the base station 110 may transmit using the first beam, and the UE 120 may receive using a first corresponding spatial filter, the SSB 602b, after the base station 110 transmits using the second beam, and the UE 120 receives using a second corresponding spatial filter, the SSB 602a. For example, the base station 110 may transmit using the first beam, and the UE 120 may receive using the first corresponding spatial filter, at least one additional synchronization signal (e.g., PSS 604b, SSS 606b, or a combination thereof, as shown in example 600) after a beam switching gap 614a following reception of the at least one signal associated with the broadcast channel (e.g., DMRS 610a and/or signal 612a). The beam switching gap 614a may include one or more symbols (e.g., one or more DFT-s-OFDM symbols, one or more SC-QAM symbols) during which the base station 110 does not transmit signals associated with the SSB 602a or the SSB 602b.

Accordingly, the UE 120 may apply the first spatial filter during the beam switching gap 614a. Similar to the time gap 608a described above, the beam switch gap 614a may have a length based at least in part on a setting stored in a memory of the UE 120 and/or a memory of the base station 110, based at least in part on the at least one signal associated with the broadcast channel (e.g., DMRS 610a and/or signal 612a), and/or based at least in part on a message from the base station 110. Similarly, the base station 110 may transmit using the first beam, and the UE 120 may receive using the first corresponding spatial filter, at least one additional signal associated with the broadcast channel (e.g., DMRS 610b, signal 612b, or a combination thereof, as shown in example 600) after the time gap 608b following reception of the at least one additional synchronization signal (e.g., PSS 604b, SSS 606b, or a combination thereof, as shown in example 600). The time gap 608b may be the same length as the time gap 608a or may be based at least in part on the at least one additional synchronization signal (e.g., PSS 604b and/or SSS 606b) and/or based at least in part on a message from the base station 110 indicating a different length for the time gap 608b than for the time gap 608a.

Although described above using two beams, the description similarly applies to using more than two beams (e.g., three beams, four beams, and so on). For example, the beam switching gap 614b may precede yet another SSB, which may be associated with a third beam and include one or more synchronization signals and one or more signals associated with a broadcast channel, separated by a time gap.

Figure 6B:
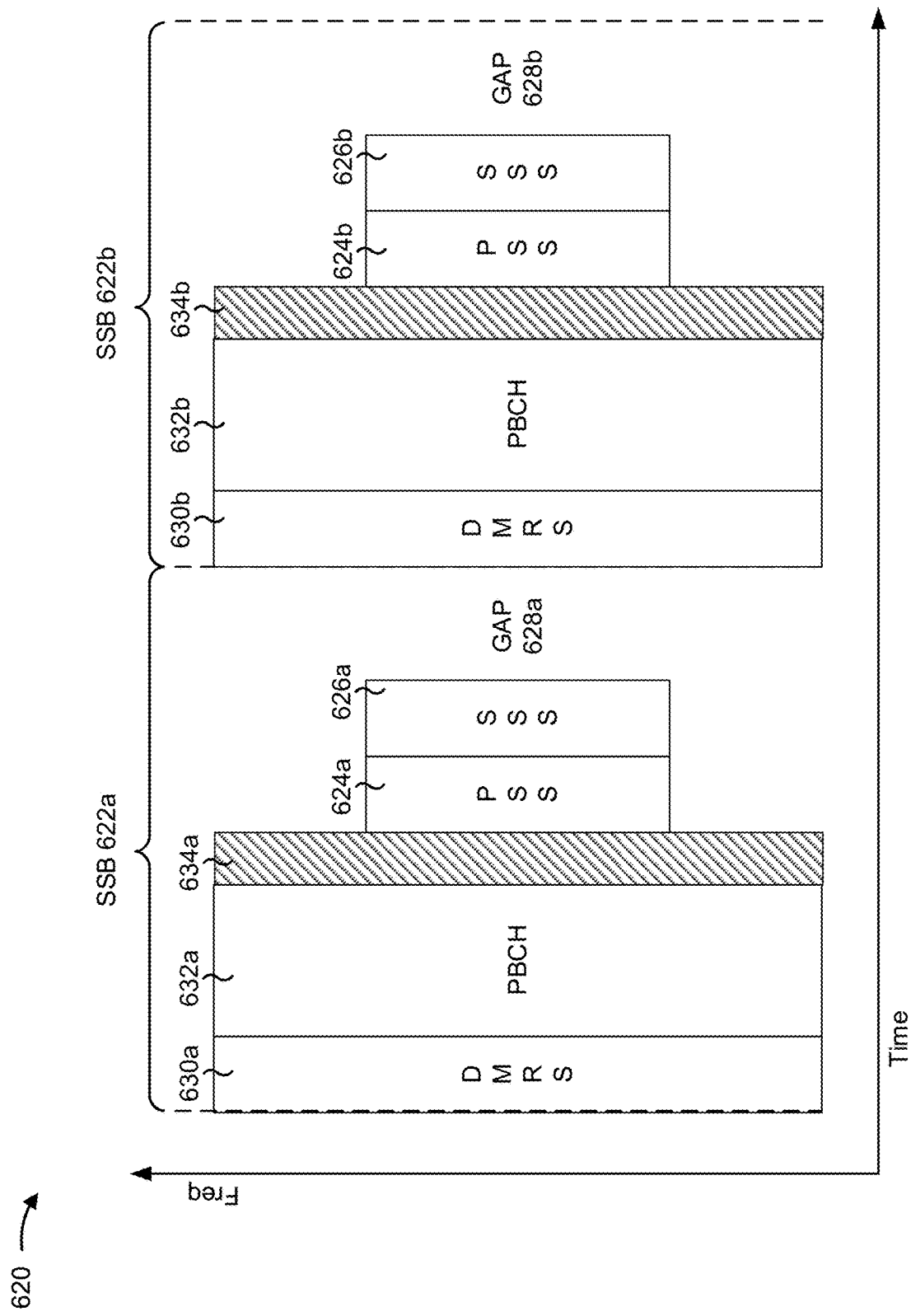

FIG. 6B is a diagram illustrating an example 620 associated with configuring time gaps in SSBs, in accordance with the present disclosure. Example 620 shows an SSB 622a that may be transmitted by a base station (e.g., base station 110) and received by a UE (e.g., UE 120). Similar to SSB 602a of example 600, SSB 622a of example 620 includes at least one synchronization signal in a first bandwidth. For example, the at least one synchronization signal may include a PSS (e.g., PSS 624a), an SSS (e.g., SSS 626a), or a combination thereof (e.g., as shown in example 620). Additionally, the SSB 622a includes at least one signal, associated with a broadcast channel, in a second bandwidth. The base station 110 may transmit, and the UE 120 may receive, the at least one synchronization signal, after a time gap 634a following the at least one signal associated with the broadcast channel. In some aspects, the broadcast channel may include a PBCH. Accordingly, the at least one signal may include a DMRS (e.g., DMRS 630a), a signal encoding content for the PBCH (e.g., signal 632a), or a combination thereof (e.g., as shown in example 620).

Similar to the time gap 608a as described above in connection with FIG. 6A, the time gap 634a may have a length based at least in part on a setting stored in a memory of the UE 120 and/or a memory of the base station 110, based at least in part on the at least one signal associated with the broadcast channel (e.g., DMRS 630a and/or signal 632a), and/or based at least in part on a message from the base station 110.

The time gap 634a may include cyclic prefix (CP) signals and/or guard interval (GI) signals transmitted by the base station 110. Additionally, or alternatively, the time gap 634b may include one or more tail symbols, encoded using a Fourier transform procedure, transmitted by the base station 110. For example, the base station 110 may add zeroes (and/or other null data) before a discrete Fourier transform (DFT) and/or another similar Fourier transform procedure. Accordingly, after subcarrier mapping, inverse fast Fourier transforming (IFFT), and/or other modulation and coding procedures, the base station 110 will have generated a signal that includes tail symbols based at least in part on the null data. The base station 110 may transmit such tail symbols when using DFT-s-OFDM technology and/or another single-carrier technology that uses Fourier transformation. Accordingly, during the time gap 634a, the base station 110 does not transmit signals used to decode the SSB 602a, and the UE 120 may configure at least one antenna of the UE 120 to receive the second bandwidth during the time gap 634a, as described above in connection with FIG. 6A. In example 620, the bases station 110 has included CP signals, GI signals, and/or tail symbols on signal 632a but may alternatively include CP signals, GI signals, and/or tail symbols on DMRS 630a, PSS 624a, and/or SSS 626a.

In some aspects, example 620 may be combined with example 400 or example 450, similar to the combination of example 600 with example 400 or example 450, as described above in connection with FIG. 6A. As an alternative, example 620 may be combined with example 500 or example 550, similar to the combination of example 600 with example 500 or example 550, as described above in connection with FIG. 6A.

Although described above with the at least one signal associated with the broadcast channel preceding the at least one synchronization signal, the SSB 622a may carry the at least one synchronization signal earlier in time than the at least one signal associated with the broadcast channel (e.g., as described above in connection with FIG. 6A).

Example 620 further shows another SSB 622b. For example, the SSB 622b may be associated with a first beam, and the SSB 622a may be associated with a second beam. Accordingly, the base station 110 may transmit using the first beam, and the UE 120 may receive using a first corresponding spatial filter, the SSB 622b, after the base station 110 transmits using the second beam, and the UE 120 receives using a second corresponding spatial filter, the SSB 622a. For example, the base station 110 may transmit using the first beam, and the UE 120 may receive using the first corresponding spatial filter, at least one additional signal associated with the broadcast channel (e.g., DMRS 630b, signal 632b, or a combination thereof, as shown in example 620) after a beam switching gap 628a following reception of the at least one synchronization signal (e.g., PSS 624a and/or SSS 626a). The beam switching gap 628a may include one or more symbols (e.g., one or more DFT-s-OFDM symbols, one or more SC-QAM symbols) during which the base station 110 does not transmit signals associated with the SSB 622a or the SSB 622b.

Accordingly, the UE 120 may apply the first spatial filter during the beam switching gap 628a. Similar to the time gap 634a described above, the beam switch gap 628a may have a length based at least in part on a setting stored in a memory of the UE 120 and/or a memory of the base station 110, based at least in part on the at least one synchronization signal (e.g., PSS 624a and/or SSS 626a), and/or based at least in part on a message from the base station 110. Similarly, the base station 110 may transmit using the first beam, and the UE 120 may receive using the first corresponding spatial filter, at least one additional synchronization signal (e.g., PSS 624b, SSS 626b, or a combination thereof, as shown in example 620) after the time gap 634b following reception of the at least one additional signal associated with the broadcast channel (e.g., DMRS 630b, signal 632b, or a combination thereof, as shown in example 620). The time gap 634b may be the same length as the time gap 634a or may be based at least in part on the at least one additional signal associated with the broadcast channel (e.g., DMRS 630b and/or signal 632b) and/or based at least in part on a message from the base station 110 indicating a different length for the time gap 634b than for the time gap 634a.

Although described above using two beams, the description similarly applies to using more than two beams (e.g., three beams, four beams, and so on). For example, the beam switching gap 628b may precede yet another SSB, which may be associated with a third beam and include one or more synchronization signals and one or more signals associated with a broadcast channel, separated by a time gap.

Figure 6C:
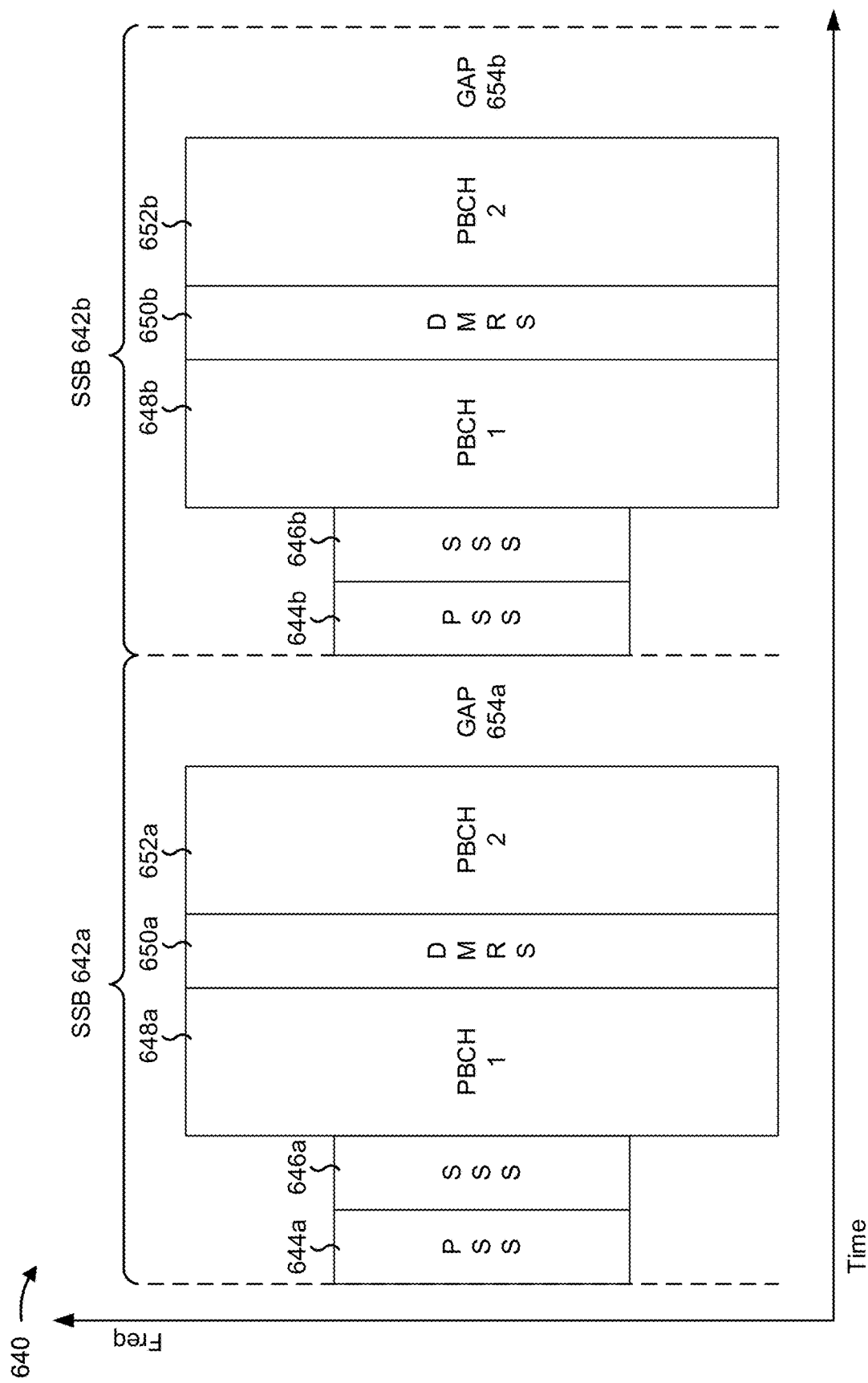

FIG. 6C is a diagram illustrating an example 640 associated with configuring time gaps in SSBs, in accordance with the present disclosure. Example 640 shows an SSB 642a that may be transmitted by a base station (e.g., base station 110) and received by a UE (e.g., UE 120). Similar to SSB 602a of example 600, SSB 642a of example 640 includes at least one synchronization signal in a first bandwidth. For example, the at least one synchronization signal may include a PSS (e.g., PSS 644a), an SSS (e.g., SSS 646a), or a combination thereof (e.g., as shown in example 640). Additionally, the SSB 642a includes at least one signal, associated with a broadcast channel, in a second bandwidth. The base station 110 may transmit, and the UE 120 may receive, the at least one signal associated with the broadcast channel, after a time gap 648a following the at least one synchronization signal. In some aspects, the broadcast channel may include a PBCH. Accordingly, the at least one signal may include a DMRS (e.g., DMRS 650a), a signal encoding content for the PBCH (e.g., signal 652a), or a combination thereof (e.g., as shown in example 640).

Similar to the time gap 608a as described above in connection with FIG. 6A, the time gap 648a may have a length based at least in part on a setting stored in a memory of the UE 120 and/or a memory of the base station 110, based at least in part on the at least one synchronization signal (e.g., PSS 644a and/or SSS 646a), and/or based at least in part on a message from the base station 110.

As shown in FIG. 6C, the base station 110 may transmit, and the UE 120 may receive, using the second bandwidth and during the time gap 648a, a retransmission of the at least one signal associated with the broadcast channel. For example, the base station 110 may retransmit the DMRS (e.g., DMRS 650a), the signal encoding content for the PBCH (e.g., signal 652a, as shown in example 640), or a combination thereof. Accordingly, a different UE may decode the at least one signal associated with the broadcast channel based at least in part on receiving the at least one signal and receiving the retransmission. For example, a different UE may have multiple activate antenna panels such that this other UE can receive on the first bandwidth and on the second bandwidth without needing to reconfigure antennas. Accordingly, the base station 110 can retransmit such that the base station 110 and this other UE experience improved reliability and/or quality when communicating the SSB 642a. However, during the time gap 648a, the base station 110 does not transmit signals that are necessary to decode the SSB 642a, such that the UE 120, lacking capability to simultaneously receive on the first bandwidth and on the second bandwidth, may configure at least one antenna of the UE 120 to receive the second bandwidth during the time gap 648a, as described above in connection with FIG. 6A. Accordingly, the UE 120 may conserve power while receiving the at least one synchronization signal but improve reliability and/or quality when receiving the at least one associated with the broadcast channel.

In some aspects, example 640 may be combined with example 400 or example 450, similar to the combination of example 600 with example 400 or example 450, as described above in connection with FIG. 6A. As an alternative, example 640 may be combined with example 500 or example 550, similar to the combination of example 600 with example 500 or example 550, as described above in connection with FIG. 6A.

Although described above with the at least one synchronization signal preceding the at least one signal associated with the broadcast channel, the SSB 642a may carry the at least one signal associated with the broadcast channel earlier in time than the at least one synchronization signal (e.g., as described above in connection with FIG. 6B).

Example 640 further shows another SSB 642b. For example, the SSB 642b may be associated with a first beam, and the SSB 642a may be associated with a second beam. Accordingly, the base station 110 may transmit using the first beam, and the UE 120 may receive using a first corresponding spatial filter, the SSB 642b, after the base station 110 transmits using the second beam, and the UE 120 receives using a second corresponding spatial filter, the SSB 642a. For example, the base station 110 may transmit using the first beam, and the UE 120 may receive using the first corresponding spatial filter, at least one additional synchronization signal (e.g., PSS 644b, SSS 646b, or a combination thereof, as shown in example 640) after a beam switching gap 654a following reception of the at least one signal associated with the broadcast channel (e.g., DMRS 650a and/or signal 652a). The beam switching gap 654a may include one or more symbols (e.g., one or more DFT-s-OFDM symbols, one or more SC-QAM symbols) during which the base station 110 does not transmit signals associated with the SSB 642a or the SSB 642b.

Accordingly, the UE 120 may apply the first spatial filter during the beam switching gap 654a. Similar to the time gap 648a described above, the beam switch gap 614a may have a length based at least in part on a setting stored in a memory of the UE 120 and/or a memory of the base station 110, based at least in part on the at least one signal associated with the broadcast channel (e.g., DMRS 650a and/or signal 652a), and/or based at least in part on a message from the base station 110. Similarly, the base station 110 may transmit using the first beam, and the UE 120 may receive using the first corresponding spatial filter, at least one additional signal associated with the broadcast channel (e.g., DMRS 650b, signal 652b, or a combination thereof, as shown in example 640) after the time gap 648b following reception of the at least one additional synchronization signal (e.g., PSS 644b, SSS 646b, or a combination thereof, as shown in example 640). The time gap 648b may be the same length as the time gap 648a or may be based at least in part on the at least one additional synchronization signal (e.g., PSS 644b and/or SSS 646b) and/or based at least in part on a message from the base station 110 indicating a different length for the time gap 648b than for the time gap 648a.

Although described above using two beams, the description similarly applies to using more than two beams (e.g., three beams, four beams, and so on). For example, the beam switching gap 654b may precede yet another SSB, which may be associated with a third beam and include one or more synchronization signals and one or more signals associated with a broadcast channel, separated by a time gap.

By using techniques as described in connection with FIGS. 6A, 6B, and/or 6C, the base station 110 may include a time gap between at least one synchronization signal (e.g., a PSS and/or an SSS) of an SSB and at least one signal associated with a broadcast channel (e.g., signals encoding content for a PBCH and/or associated DMRSs) of that SSB. As a result, the base station 110 may transmit the at least one synchronization signal using a first bandwidth and transmit the at least one signal associated with the broadcast channel using a second bandwidth. For example, the first bandwidth may be smaller in order to conserve power and network overhead while the second bandwidth may be larger in order to improve reliability and/or quality of the at least one signal associated with the broadcast channel Additionally, the UE 120 may switch bandwidths during the time gap provided by the base station 110. Accordingly, the UE 120 may conserve power while receiving the at least one synchronization signal but improve reliability and/or quality when receiving the at least one signal associated with the broadcast channel.

As indicated above, FIGS. 6A-6C are provided as examples. Other examples may differ from what is described with respect to FIGS. 6A-6C.

Figure 7:
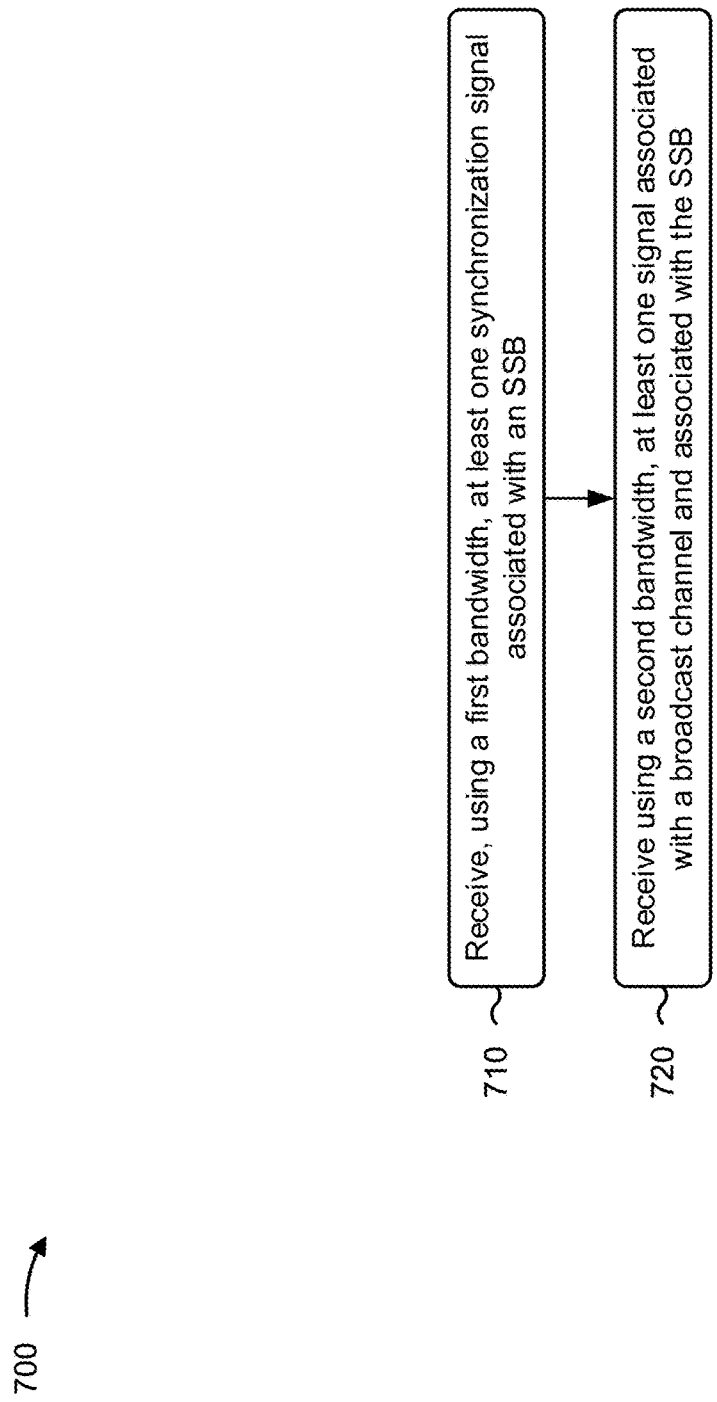
FIGS. 7 and 8 are diagrams illustrating example processes associated with configuring time gaps in SSBs, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 900 of FIG. 9) performs operations associated with configuring time gaps in SSBs.

As shown in FIG. 7, in some aspects, process 700 may include receiving, from a base station (e.g., base station 110 and/or apparatus 1000 of FIG. 10) and using a first bandwidth, at least one synchronization signal associated with an SSB (block 710). For example, the UE (e.g., using reception component 902, depicted in FIG. 9) may receive, using the first bandwidth, the at least one synchronization signal, as described above.

As further shown in FIG. 7, in some aspects, process 700 may include receiving, from the base station, using a second bandwidth, at least one signal associated with a broadcast channel and associated with the SSB (block 720). For example, the UE (e.g., using reception component 902) may receive, using the second bandwidth, the at least one signal associated with a broadcast channel, as described above. In some aspects, the at least one synchronization signal and the at least one signal associated with the broadcast channel are separated by a time gap.

Process 700 may include additional aspects, such as any single aspect or any combination of aspects described below and/or in connection with one or more other processes described elsewhere herein.

In a first aspect, the at least one synchronization signal includes a PSS, an SSS, or a combination thereof.

In a second aspect, alone or in combination with the first aspect, the broadcast channel includes a PBCH.

In a third aspect, alone or in combination with one or more of the first and second aspects, the at least one signal associated with the broadcast channel includes a DMRS, a signal encoding content for the broadcast channel, or a combination thereof.

In a fourth aspect, alone or in combination with one or more of the first through third aspects, process 700 further includes receiving (e.g., using reception component 902), from the base station and after receiving the at least one signal associated with the broadcast channel, at least one of a CORESET or an SIB message.

In a fifth aspect, alone or in combination with one or more of the first through fourth aspects, the at least one of the CORESET or the SIB message are multiplexed with the at least one synchronization signal in frequency.

In a sixth aspect, alone or in combination with one or more of the first through fifth aspects, the at least one synchronization signal and the at least one signal associated with the broadcast channel are received using a second beam, and process 700 further includes receiving (e.g., using reception component 902), from the base station, using a first beam, at least one additional synchronization signal associated with an additional SSB, and receiving (e.g., using reception component 902), from the base station, using the first beam, at least one additional signal associated with the broadcast channel and associated with the additional SSB, where the at least one additional synchronization signal and the at least one additional signal associated with the broadcast channel are separated by the time gap, and the SSB and the additional SSB are separated by at least a beam switching gap.

In a seventh aspect, alone or in combination with one or more of the first through sixth aspects, process 700 further includes configuring (e.g., using configuration component 908, depicted in FIG. 9) at least one antenna of the UE to receive the second bandwidth during the time gap.

In an eighth aspect, alone or in combination with one or more of the first through seventh aspects, the time gap includes one or more symbols.

In a ninth aspect, alone or in combination with one or more of the first through eighth aspects, at least one of cyclic prefix signals or guard interval signals are transmitted during the time gap.

In a tenth aspect, alone or in combination with one or more of the first through ninth aspects, one or more tail symbols, encoded using a Fourier transform procedure, are transmitted during the time gap.

In an eleventh aspect, alone or in combination with one or more of the first through tenth aspects, process 700 further includes receiving (e.g., using reception component 902), from the base station, using the second bandwidth and during the time gap, a retransmission of the at least one signal associated with the broadcast channel, and the at least one signal associated with the broadcast channel is decoded based at least in part on receiving the at least one signal and receiving the retransmission.

In a twelfth aspect, alone or in combination with one or more of the first through eleventh aspects, a length of the time gap is based at least in part on a setting stored in the memory of the UE.

In a thirteenth aspect, alone or in combination with one or more of the first through twelfth aspects, a length of the time gap is determined based at least in part on the at least one synchronization signal.

In a fourteenth aspect, alone or in combination with one or more of the first through thirteenth aspects, process 700 further includes receiving (e.g., using reception component 902), from the base station, a message indicating a length of the time gap.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
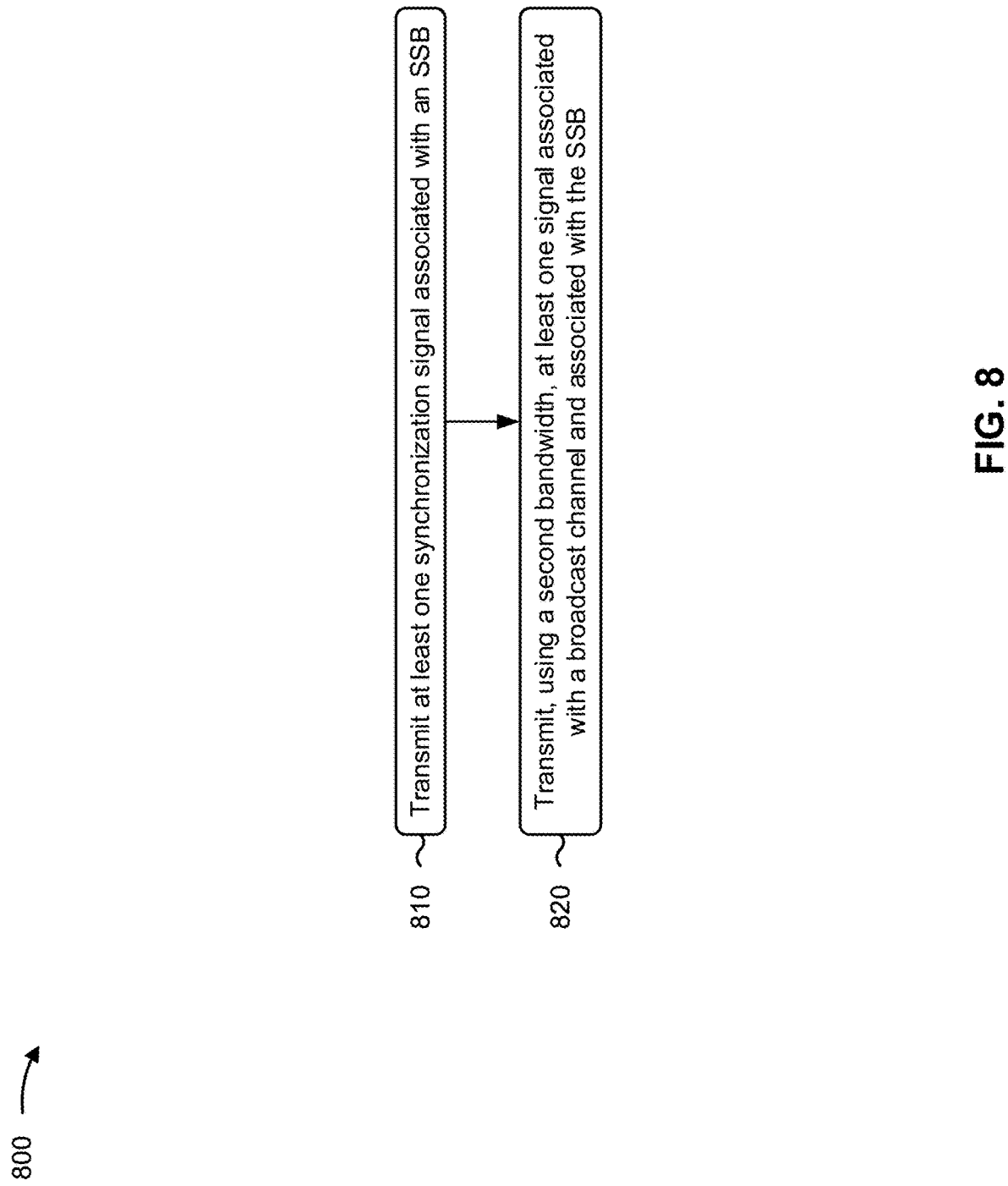

FIG. 8 is a diagram illustrating an example process 800 performed, for example, by a base station, in accordance with the present disclosure. Example process 800 is an example where the base station (e.g., base station 110 and/or apparatus 1000) performs operations associated with configuring time gaps in SSBs.

As shown in FIG. 8, in some aspects, process 800 may include transmitting, using a first bandwidth, at least one synchronization signal associated with an SSB (block 810). For example, the base station (e.g., using transmission component 1004, depicted in FIG. 10) may transmit, using the first bandwidth, the at least one synchronization signal, as described above.

As further shown in FIG. 8, in some aspects, process 800 may include transmitting, using a second bandwidth, at least one signal associated with a broadcast channel and associated with the SSB (block 820). For example, the base station (e.g., using transmission component 1004) may transmit, using the second bandwidth, the at least one signal associated with a broadcast channel, as described above. In some aspects, the at least one synchronization signal and the at least one signal associated with the broadcast channel are separated by a time gap.

Process 800 may include additional aspects, such as any single aspect or any combination of aspects described below and/or in connection with one or more other processes described elsewhere herein.

In a first aspect, the at least one synchronization signal includes a PSS, an SSS, or a combination thereof.

In a second aspect, alone or in combination with the first aspect, the broadcast channel includes a PBCH.

In a third aspect, alone or in combination with one or more of the first and second aspects, the at least one signal associated with the broadcast channel includes a DMRS, a signal encoding content for the broadcast channel, or a combination thereof.

In a fourth aspect, alone or in combination with one or more of the first through third aspects, process 800 further includes transmitting (e.g., using transmission component 1004), after transmitting the at least one signal associated with the broadcast channel, at least one of a CORESET or an SIB message.

In a fifth aspect, alone or in combination with one or more of the first through fourth aspects, the at least one of the CORESET or the SIB message are multiplexed with the at least one synchronization signal in frequency.

In a sixth aspect, alone or in combination with one or more of the first through fifth aspects, the at least one synchronization signal and the at least one signal associated with the broadcast channel are transmitted using a second beam, and process 800 further includes transmitting (e.g., using transmission component 1004), using a first beam, at least one additional synchronization signal associated with an additional SSB, and transmitting (e.g., using transmission component 1004), using the first beam, at least one additional signal associated with the broadcast channel and associated with the additional SSB, where the at least one additional synchronization signal and the at least one additional signal associated with the broadcast channel are separated by the time gap, and the SSB and the additional SSB are separated by at least a beam switching gap.

In a seventh aspect, alone or in combination with one or more of the first through sixth aspects, the time gap includes one or more symbols.

In an eighth aspect, alone or in combination with one or more of the first through seventh aspects, process 800 further includes transmitting (e.g., using transmission component 1004) at least one of cyclic prefix signals or guard interval signals during the time gap.

In a ninth aspect, alone or in combination with one or more of the first through eighth aspects, process 800 further includes transmitting (e.g., using transmission component 1004), during the time gap, one or more tail symbols encoded using a Fourier transform procedure.

In a tenth aspect, alone or in combination with one or more of the first through ninth aspects, process 800 further includes transmitting (e.g., using transmission component 1004), using the second bandwidth and during the time gap, a retransmission of the at least one signal associated with the broadcast channel.

In an eleventh aspect, alone or in combination with one or more of the first through tenth aspects, a length of the time gap is based at least in part on a setting stored in the memory of the base station.

In a twelfth aspect, alone or in combination with one or more of the first through eleventh aspects, a length of the time gap is indicated using the at least one synchronization signal.

In a thirteenth aspect, alone or in combination with one or more of the first through twelfth aspects, process 800 further includes transmitting (e.g., using transmission component 1004) a message indicating a length of the time gap.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
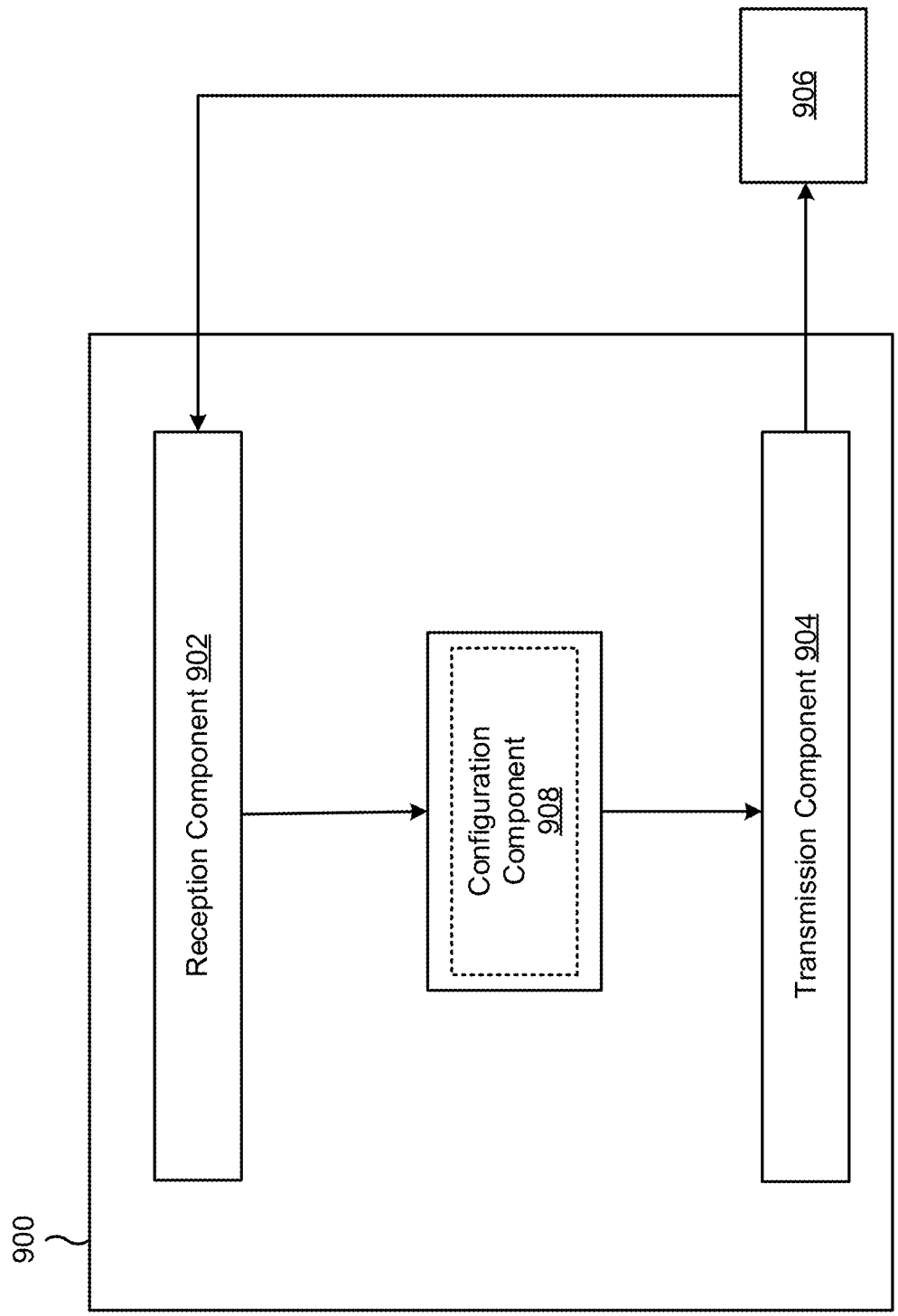
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a configuration component 908, among other examples.

In some aspects, the apparatus 900 may be configured to perform one or more operations described herein in connection with FIGS. 6A-6C. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

In some aspects, the reception component 902 may receive, from the apparatus 906 and using a first bandwidth, at least one synchronization signal associated with an SSB. Additionally, the reception component 902 may receive, from the apparatus 906, using a second bandwidth, at least one signal associated with a broadcast channel and associated with the SSB. The at least one synchronization signal and the at least one signal associated with the broadcast channel may be separated by a time gap. For example, the configuration component 908 may configure at least one antenna of the apparatus 900 (e.g., included in the reception component 902) to receive the second bandwidth during the time gap. In some aspects, the configuration component 908 may include a demodulator, a MIMO detector, a receive processor, a controller/processor, a memory, or a combination thereof, of the UE described above in connection with FIG. 2. As an alternative, the reception component 902 may receive, from the apparatus 906, using the second bandwidth and during the time gap, a retransmission of the at least one signal associated with the broadcast channel. For example, the reception component 902 may include a plurality of antennas (and/or antenna panels) that can receive using the first bandwidth and the second bandwidth simultaneously.

In some aspects, the reception component 902 may receive, from the apparatus 906, a message indicating a length of the time gap. For example, the message may include an RRC message, a MAC-CE, and/or DCI.

In some aspects, the reception component 902 may receive, from the apparatus 906 and after receiving the at least one signal associated with the broadcast channel, at least one of a CORESET or an SIB message. Additionally, or alternatively, the reception component 902 may receive, from the apparatus 906, using a first beam, at least one additional synchronization signal associated with an additional SSB, and the reception component 902 may receive, from the apparatus 906, using the first beam, at least one additional signal associated with the broadcast channel and associated with the additional SSB. The at least one additional synchronization signal and the at least one additional signal associated with the broadcast channel may be separated by the time gap, the SSB and the additional SSB may be separated by at least a beam switching gap, and the reception component 902 may receive the at least one synchronization signal and the at least one signal associated with the broadcast channel using a second beam. For example, the configuration component 908 may configure at least one antenna of the apparatus 900 (e.g., included in the reception component 902) to receive using the first beam during the beam switching gap. As an alternative, the reception component 902 may include a plurality of antennas (and/or antenna panels) that can receive using the first beam and the second beam simultaneously.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
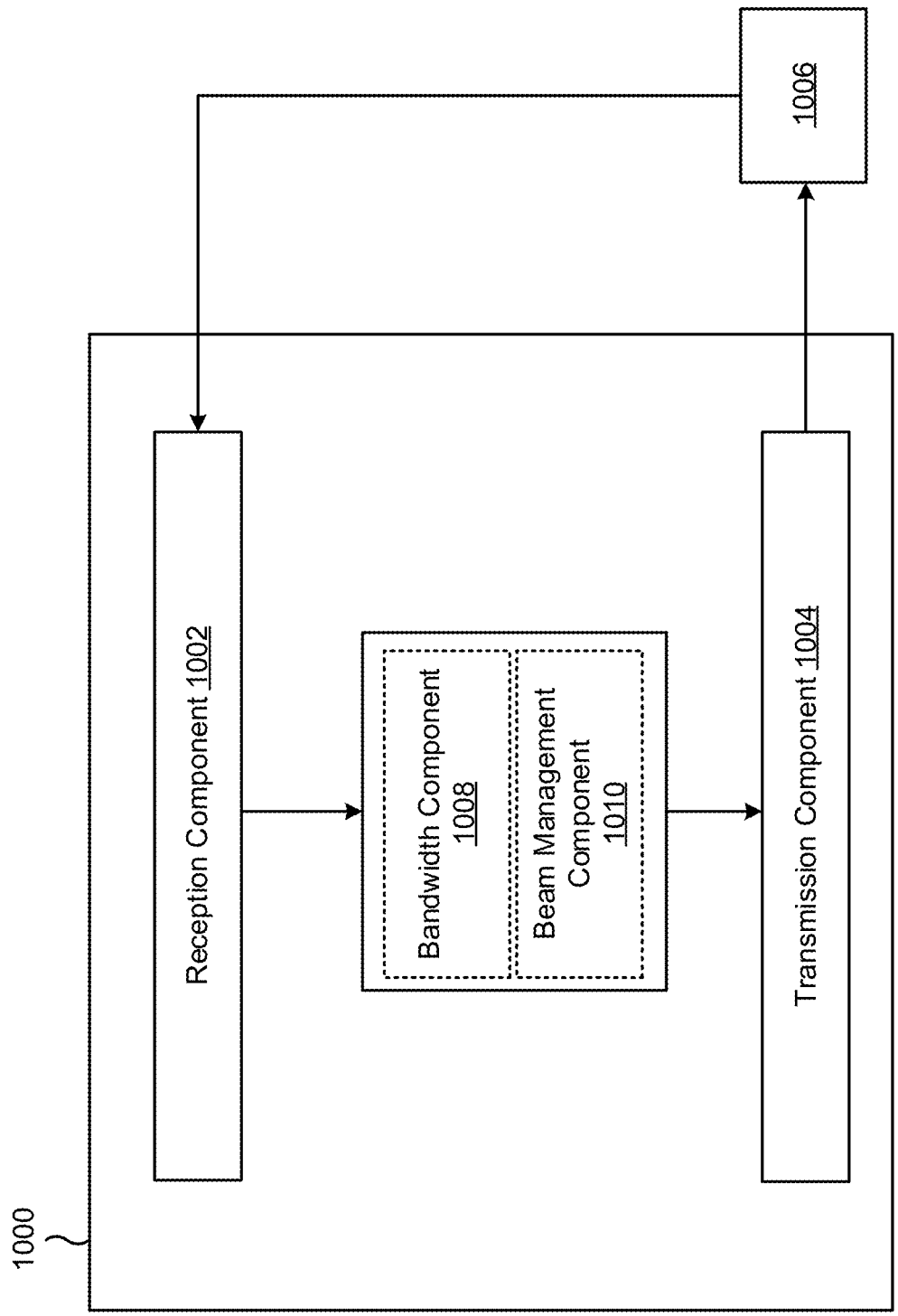

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a bandwidth component 1008 or a beam management component 1010, among other examples.

In some aspects, the apparatus 1000 may be configured to perform one or more operations described herein in connection with FIGS. 6A-6C. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

In some aspects, the transmission component 1004 may transmit, using a first bandwidth, at least one synchronization signal associated with an SSB. Additionally, the transmission component 1004 may transmit, using a second bandwidth, at least one signal associated with a broadcast channel and associated with the SSB. The at least one synchronization signal and the at least one signal associated with the broadcast channel may be separated by a time gap. For example, the bandwidth component 1008 may configure at least one antenna of the apparatus 1000 (e.g., included in the transmission component 1004) to transmit using the second bandwidth during the time gap. In some aspects, the bandwidth component 1008 may include a modulator, a transmit MIMO processor, a transmit processor, a controller/processor, a memory, or a combination thereof, of the base station described above in connection with FIG. 2. As an alternative, the transmission component 1004 may include a plurality of antennas (and/or antenna panels) that can transmit using the first bandwidth and the second bandwidth simultaneously.

In some aspects, the transmission component 1004 may transmit a message indicating a length of the time gap. For example, the message may include an RRC message, a MAC-CE, and/or DCI.

In some aspects, the transmission component 1004 may transmit at least one of cyclic prefix signals or guard interval signals during the time gap. As an alternative, the transmission component 1004 may transmit, during the time gap, one or more tail symbols encoded using a Fourier transform procedure. As an alternative, transmission component 1004 may transmit, using the second bandwidth and during the time gap, a retransmission of the at least one signal associated with the broadcast channel.

In some aspects, the transmission component 1004 may transmit, after transmitting the at least one signal associated with the broadcast channel, at least one of a CORESET or an SIB message. Additionally, or alternatively, the transmission component 1004 may transmit, using a first beam, at least one additional synchronization signal associated with an additional SSB, and the transmission component 1004 may transmit, using the first beam, at least one additional signal associated with the broadcast channel and associated with the additional SSB. The at least one additional synchronization signal and the at least one additional signal associated with the broadcast channel may be separated by the time gap, the SSB and the additional SSB may be separated by at least a beam switching gap, and the transmission component 1004 may transmit the at least one synchronization signal and the at least one signal associated with the broadcast channel using a second beam. For example, the beam management component 1010 may configure at least one antenna of the apparatus 1000 (e.g., included in the transmission component 1004) to transmit using the first beam during the beam switching gap. In some aspects, the beam management component 1010 may include a modulator, a transmit MIMO processor, a transmit processor, a controller/processor, a memory, or a combination thereof, of the base station described above in connection with FIG. 2. As an alternative, the transmission component 1004 may include a plurality of antennas (and/or antenna panels) that can transmit using the first beam and the second beam simultaneously.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some aspects of the present disclosure:

Aspect 1: A method of wireless communication performed by a user equipment (UE), comprising: receiving, from a base station and using a first bandwidth, at least one synchronization signal associated with a synchronization signal block (SSB); and receiving, from the base station, using a second bandwidth, at least one signal associated with a broadcast channel, wherein the at least one synchronization signal and the at least one signal associated with the broadcast channel are separated by a time gap.

Aspect 2: The method of aspect 1, wherein the at least one synchronization signal includes a primary synchronization signal, a secondary synchronization signal, or a combination thereof.

Aspect 3: The method of any of aspects 1 through 2, wherein the broadcast channel includes a physical broadcast channel (PBCH).

Aspect 4: The method of any of aspects 1 through 3, wherein the at least one signal associated with the broadcast channel includes a demodulation reference signal, a signal encoding content for the broadcast channel, or a combination thereof.

Aspect 5: The method of any of aspects 1 through 4, further comprising: receiving, from the base station and after receiving the at least one signal associated with the broadcast channel, at least one of a control resource set (CORESET) or a system information block (SIB) message.

Aspect 6: The method of aspect 5, wherein the at least one of the CORESET or the SIB message are multiplexed with the at least one synchronization signal in frequency.

Aspect 7: The method of any of aspects 1 through 6, further comprising: receiving, from the base station, using a first beam, at least one additional synchronization signal associated with an additional SSB; and receiving, from the base station, using the first beam, at least one additional signal associated with the broadcast channel and associated with the additional SSB, wherein the at least one additional synchronization signal and the at least one additional signal associated with the broadcast channel are separated by the time gap, wherein the SSB and the additional SSB are separated by at least a beam switching gap, and wherein the at least one synchronization signal and the at least one signal associated with the broadcast channel are transmitted using a second beam.

Aspect 8: The method of any of aspects 1 through 7, further comprising: configuring at least one antenna of the UE to receive the second bandwidth during the time gap.

Aspect 9: The method of any of aspects 1 through 8, wherein the time gap includes one or more symbols.

Aspect 10: The method of any of aspects 1 through 8, wherein at least one of cyclic prefix signals or guard interval signals are transmitted during the time gap.

Aspect 11: The method of any of aspects 1 through 8, wherein one or more tail symbols, encoded using a Fourier transform procedure, are transmitted during the time gap.

Aspect 12: The method of any of aspects 1 through 8, further comprising: receiving, from the base station, using the second bandwidth and during the time gap, a retransmission of the at least one signal associated with the broadcast channel, wherein the at least one signal associated with the broadcast channel is decoded based at least in part on receiving the at least one signal and receiving the retransmission.

Aspect 13: The method of any of aspects 1 through 12, wherein a length of the time gap is based at least in part on a setting stored in the memory of the UE.

Aspect 14: The method of any of aspects 1 through 13, wherein a length of the time gap is determined based at least in part on the at least one synchronization signal.

Aspect 15: The method of any of aspects 1 through 14, further comprising: receiving, from the base station, a message indicating a length of the time gap.

Aspect 16: A method of wireless communication performed by a base station, comprising: transmitting, using a first bandwidth, at least one synchronization signal associated with a synchronization signal block (SSB); and transmitting, using a second bandwidth, at least one signal associated with a broadcast channel and associated with the SSB, wherein the at least one synchronization signal and the at least one signal associated with the broadcast channel are separated by a time gap.

Aspect 17: The method of aspect 16, wherein the at least one synchronization signal includes a primary synchronization signal, a secondary synchronization signal, or a combination thereof.

Aspect 18: The method of any of aspects 16 through 17, wherein the broadcast channel includes a physical broadcast channel (PBCH).

Aspect 19: The method of any of aspects 16 through 18, wherein the at least one signal associated with the broadcast channel includes a demodulation reference signal, a signal encoding content for the broadcast channel, or a combination thereof.

Aspect 20: The method of any of aspects 16 through 19, further comprising: transmitting, after transmitting the at least one signal associated with the broadcast channel, at least one of a control resource set (CORESET) or a system information block (SIB) message.

Aspect 21: The method of aspect 20, wherein the at least one of the CORESET or the SIB message are multiplexed with the at least one synchronization signal in frequency.

Aspect 22: The method of any of aspects 16 through 21, further comprising: transmitting, using a first beam, at least one additional synchronization signal associated with an additional SSB; and transmitting, using the first beam, at least one additional signal associated with the broadcast channel and associated with the additional SSB, wherein the at least one additional synchronization signal and the at least one additional signal associated with the broadcast channel are separated by the time gap, wherein the SSB and the additional SSB are separated by at least a beam switching gap, and wherein the at least one synchronization signal and the at least one signal associated with the broadcast channel are transmitted using a second beam.

Aspect 23: The method of any of aspects 16 through 22, wherein the time gap includes one or more symbols.

Aspect 24: The method of any of aspects 16 through 22, further comprising: transmitting at least one of cyclic prefix signals or guard interval signals during the time gap.

Aspect 25: The method of any of aspects 16 through 22, further comprising: transmitting, during the time gap, one or more tail symbols encoded using a Fourier transform procedure.

Aspect 26: The method of any of aspects 16 through 22, further comprising: transmitting, using the second bandwidth and during the time gap, a retransmission of the at least one signal associated with the broadcast channel.

Aspect 27: The method of any of aspects 16 through 26, wherein a length of the time gap is based at least in part on a setting stored in the memory of the base station.

Aspect 28: The method of any of aspects 16 through 27, wherein a length of the time gap is indicated using the at least one synchronization signal.

Aspect 29: The method of any of aspects 16 through 28, further comprising: transmitting a message indicating a length of the time gap.

Aspect 30: An apparatus for wireless communication at a device, comprising a processor; memory coupled with the processor; and instructions stored in the memory and executable by the processor to cause the apparatus to perform the method of one or more aspects of aspects 1-15.

Aspect 31: A device for wireless communication, comprising a memory and one or more processors coupled to the memory, the memory and the one or more processors configured to perform the method of one or more aspects of aspects 1-15.

Aspect 32: An apparatus for wireless communication, comprising at least one means for performing the method of one or more aspects of aspects 1-15.

Aspect 33: A non-transitory computer-readable medium storing code for wireless communication, the code comprising instructions executable by a processor to perform the method of one or more aspects of aspects 1-15.

Aspect 34: A non-transitory computer-readable medium storing a set of instructions for wireless communication, the set of instructions comprising one or more instructions that, when executed by one or more processors of a device, cause the device to perform the method of one or more aspects of aspects 1-15.

Aspect 35: An apparatus for wireless communication at a device, comprising a processor; memory coupled with the processor; and instructions stored in the memory and executable by the processor to cause the apparatus to perform the method of one or more aspects of aspects 16-29.

Aspect 36: A device for wireless communication, comprising a memory and one or more processors coupled to the memory, the memory and the one or more processors configured to perform the method of one or more aspects of aspects 16-29.

Aspect 37: An apparatus for wireless communication, comprising at least one means for performing the method of one or more aspects of aspects 16-29.

Aspect 38: A non-transitory computer-readable medium storing code for wireless communication, the code comprising instructions executable by a processor to perform the method of one or more aspects of aspects 16-29.

Aspect 39: A non-transitory computer-readable medium storing a set of instructions for wireless communication, the set of instructions comprising one or more instructions that, when executed by one or more processors of a device, cause the device to perform the method of one or more aspects of aspects 16-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors coupled to the one or more memories, the one or more processors configured to:
receive, from a network node, a message indicating a time gap, comprising one or more symbols, for the UE to switch from using a first bandwidth, associated with a first synchronization signal, to using a second bandwidth associated with a first subsequent signal,
wherein the time gap separates the first synchronization signal, associated with a first synchronization signal block (SSB), from the first subsequent signal associated with a broadcast channel and the first SSB, and
wherein a length of the one or more symbols of the time gap is:
stored in the one or more memories of the UE,
based at least in part on a sequence of the first synchronization signal, or
indicated in the message;
receive, from the network node, based at least in part on receiving the message, and using the first bandwidth, the first synchronization signal for receiving the first subsequent signal;
switch, after receiving the first synchronization signal, based at least in part on receiving the message, and during the time gap, from the first bandwidth to the second bandwidth;
receive, from the network node and using the second bandwidth, the first subsequent signal;
receive, from the network node, using the first bandwidth, and based at least in part on receiving the first subsequent signal, a second synchronization signal associated with a second SSB; and
receive, from the network node, using the second bandwidth, and based at least in part on receiving the second synchronization signal, a second subsequentsignal associated with the broadcast channel and the second SSB,
wherein the second synchronization signal and the second subsequent signal are separated by the time gap.

2. The UE of claim 1, wherein the first synchronization signal includes a primary synchronization signal, a secondary synchronization signal, or a combination thereof.

3. The UE of claim 1, wherein the broadcast channel includes a physical broadcast channel (PBCH).

4. The UE of claim 3, wherein the first subsequent signal includes a demodulation reference signal, a signal encoding content for the PBCH, or a combination thereof.

5. The UE of claim 1, wherein the one or more processors are further configured to:
receive, from the network node and after receiving the first subsequent signal, at least one of a control resource set or a system information block message.

6. The UE of claim 1, wherein the one or more processors are further configured to:
receive, from the network node, at least one of a control resource set (CORESET) or a system information block (SIB) message,
wherein the at least one of the CORESET or the SIB message are multiplexed with the first synchronization signal in frequency.

7. The UE of claim 1, wherein the one or more processors are further configured to:
receive, using the first bandwidth or the second bandwidth, at least one of cyclic prefix signals or guard interval signals during the time gap.

8. The UE of claim 1, wherein the one or more processors are further configured to:
receive, using the first bandwidth or the second bandwidth, one or more tail symbols, encoded using a Fourier transform procedure, during the time gap.

9. The UE of claim 1, wherein the one or more processors are further configured to:
receive, from the network node, using the second bandwidth, and during the time gap, a retransmission of the first subsequent signal,
wherein the first subsequent signal is decoded based at least in part on receiving the retransmission of the first subsequent signal.

10. The UE of claim 1, wherein the length of the one or more symbols of the time gap is stored in the one or more memories of the UE.

11. The UE of claim 1, wherein the length of the one or more symbols of the time gap is based at least in part on the sequence of the first synchronization signal.

12. The UE of claim 1, wherein the message indicates the length of the one or more symbols of the time gap.

13. A network node for wireless communication, comprising:
one or more memories; and
one or more processors coupled to the one or more memories, the one or more processors configured to:
transmit, to a user equipment (UE), a message indicating a time gap, comprising one or more symbols, for the UE to switch from using a first bandwidth, associated with a first synchronization signal, to using a second bandwidth associated with a first subsequent signal,
wherein the time gap separates the first synchronization signal, associated with a first synchronization signal block (SSB), from the first subsequent signal associated with a broadcast channel and the first SSB, and
wherein a length of the one or more symbols of the time gap is:
based at least in part on a sequence of the first synchronization signal, or
indicated in the message;
transmit, to the UE, based at least in part on transmitting the message, and using the first bandwidth, the first synchronization signal for transmitting the first subsequent signal;

transmit, to the UE and using the second bandwidth, the first subsequent signal;

transmit, to the UE, using the first bandwidth, and based at least in part on transmitting the first subsequent signal, a second synchronization signal associated with a second SSB; and transmit, to the UE, using the second bandwidth, and based at least in part on transmitting the second synchronization signal, a second subsequent signal associated with the broadcast channel and the second SSB, wherein the second synchronization signal and the second subsequent signal are separated by the time gap.

14. The network node of claim 13, wherein the first synchronization signal includes a primary synchronization signal, a secondary synchronization signal, or a combination thereof.

15. The network node of claim 13, wherein the broadcast channel includes a physical broadcast channel (PBCH).

16. The network node of claim 15, wherein the first subsequent signal includes a demodulation reference signal, a signal encoding content for the PBCH, or a combination thereof.

17. The network node of claim 13, wherein the one or more processors are further configured to:

transmit, after transmitting the first subsequent signal, at least one of a control resource set or a system information block message.

18. The network node of claim 13, wherein the one or more processors are further configured to:

transmit at least one of a control resource set (CORESET) or a system information block (SIB) message, wherein the at least one of the CORESET or the SIB message are multiplexed with the first synchronization signal in frequency.

19. The network node of claim 13, wherein the one or more processors are further configured to:

transmit, using the first bandwidth or the second bandwidth, at least one of cyclic prefix signals or guard interval signals during the time gap.

20. The network node of claim 13, wherein the one or more processors are further configured to:

transmit, using the first bandwidth or the second bandwidth, one or more tail symbols, encoded using a Fourier transform procedure, during the time gap.

21. The network node of claim 13, wherein the one or more processors are further configured to:

transmit, using the second bandwidth and during the time gap, a retransmission of the first subsequent signal.

22. The network node of claim 13, wherein the length of the one or more symbols of the time gap is indicated using the sequence of the first synchronization signal.

23. The network node of claim 13, wherein the length of the one or more symbols of the time gap is indicated in the message.

24. A method of wireless communication performed by a user equipment (UE), comprising:

receiving, from a network node, a message indicating a time gap, comprising one or more symbols, for the UE to switch from using a first bandwidth, associated a first synchronization signal, to using a second bandwidth associated with a first subsequent signal, wherein the time gap separates the first synchronization signal, associated with a first synchronization signal block (SSB), from the first subsequent signal associated with a broadcast channel and the first SSB, and wherein a length of the one or more symbols of the time gap is:

stored in a memory of the UE, based at least in part on a sequence of the first synchronization signal, or indicated in the message;

receiving, from the network node, based at least in part on receiving the message, and using the first bandwidth, the first synchronization signal for receiving the first subsequent signal;

switching, after receiving the first synchronization signal, based at least in part on receiving the message, and during the time gap, from the first bandwidth to the second bandwidth;

receiving, from the network node and using the second bandwidth, the first subsequent signal;

receiving, from the network node, using the first bandwidth, and based at least in part on receiving the first subsequent signal, a second synchronization signal associated with a second SSB; and receiving, from the network node, using the second bandwidth, and based at least in part on receiving the second synchronization signal, a second subsequent signal associated with the broadcast channel and the second SSB, wherein the second synchronization signal and the second subsequent signal are separated by the time gap.

25. A method of wireless communication performed by a network node, comprising:

transmitting, to a user equipment (UE), a message indicating a time gap, comprising one or more symbols, for the UE to switch from using a first bandwidth, associated with a first synchronization signal, to using a second bandwidth associated with a first subsequent signal, wherein the time gap separates the first synchronization signal, associated with a first synchronization signal block (SSB), from the first subsequent signal associated with a broadcast channel and the first SSB, and wherein a length of the one or more symbols of the time gap is:

based at least in part on a sequence of the first synchronization signal, or indicated in the message;

transmitting, to the UE, based at least in part on transmitting the message, and using the first bandwidth, the first synchronization signal for transmitting the first subsequent signal associated with a broadcast channel and the SSB;

transmitting, to the UE and using the second bandwidth, the first subsequent signal;

transmitting, to the UE, using the first bandwidth, and based at least in part on transmitting the first subsequent signal, a second synchronization signal associated with a second SSB; and transmitting, to the UE, using the second bandwidth, and based at least in part on transmitting the second synchronization signal, a second subsequent signal associated with the broadcast channel and the second SSB, wherein the second synchronization signal and the second subsequent signal are separated by the time gap.

26. The method of claim 24, wherein the first synchronization signal includes a primary synchronization signal, a secondary synchronization signal, or a combination thereof.

27. The UE of claim 1, wherein the network node does not transmit the first subsequent signal during the time gap.

28. The network node of claim 13, wherein the one or more processors are further configured to:
   refrain from transmitting the first subsequent signal during the time gap.

29. The method of claim 25, wherein the first synchronization signal includes a primary synchronization signal, a secondary synchronization signal, or a combination thereof.

30. The method of claim 25, wherein the broadcast channel includes a physical broadcast channel (PBCH).

* * * * *